United States Patent
Wang

(10) Patent No.: US 11,347,194 B2
(45) Date of Patent: *May 31, 2022

(54) AUTOMATION INTERFACE

(71) Applicant: BEET, Inc., Plymouth, MI (US)

(72) Inventor: David Jingqiu Wang, Northville, MI (US)

(73) Assignee: BEET, INC., Southfield, MI (US)

( * ) Notice: Subject to any disclaimer, the term of this patent is extended or adjusted under 35 U.S.C. 154(b) by 91 days.

This patent is subject to a terminal disclaimer.

(21) Appl. No.: 16/825,954

(22) Filed: Mar. 20, 2020

(65) Prior Publication Data

US 2020/0218238 A1 Jul. 9, 2020

Related U.S. Application Data

(63) Continuation of application No. 15/306,954, filed as application No. PCT/US2015/029907 on May 8, (Continued)

(51) Int. Cl.
*G05B 23/02* (2006.01)
*G05B 19/048* (2006.01)
(Continued)

(52) U.S. Cl.
CPC ............ *G05B 19/048* (2013.01); *G05B 11/01* (2013.01); *G05B 19/0423* (2013.01);
(Continued)

(58) Field of Classification Search
CPC ............ G05B 2219/25407; G05B 2219/35472
(Continued)

(56) References Cited

U.S. PATENT DOCUMENTS

2011/0295596 A1* 12/2011 Hung .................... G10L 19/167
704/201
2012/0310865 A1 12/2012 Wang
(Continued)

FOREIGN PATENT DOCUMENTS

| CN | 1185212 A | 6/1998 |
| CN | 1417958 A | 5/2003 |

(Continued)

OTHER PUBLICATIONS

Office Action issued by China Intellectual Property Office for Chinese application No. CN201811452271.5, dated Jun. 9, 2021.
(Continued)

*Primary Examiner* — Emilio J Saavedra
(74) *Attorney, Agent, or Firm* — Quinn IP Law

(57) ABSTRACT

A system for controlling automation includes a machine which collects data generated by performance of an operation by the machine. A user device displays a machine control interface (MCI) corresponding to the machine. The MCI displays the collected data to a touch interface of the user device, and defines at least one touch activated user interface element (UIE) for manipulating the data. The user device can be enabled as an automation human machine interface (HMI) device for controlling an operation performed by the machine, such that a touch action applied to a UIE of the MCI controls the operation. A prerequisite condition to enabling the user device as an automation HMI device can include activation of an enabling switch selectively connected to the user device. The MCI can be stored in a memory of the enabling switch and retrieved from the enabling switch by the user device.

14 Claims, 9 Drawing Sheets

Related U.S. Application Data 2015, now Pat. No. 10,599,133, which is a continuation-in-part of application No. 14/705,421, filed on May 6, 2015, now Pat. No. 10,048,670.

(60) Provisional application No. 61/990,148, filed on May 8, 2014, provisional application No. 61/990,151, filed on May 8, 2014, provisional application No. 61/990,156, filed on May 8, 2014, provisional application No. 61/990,158, filed on May 8, 2014, provisional application No. 61/990,159, filed on May 8, 2014, provisional application No. 61/990,163, filed on May 8, 2014, provisional application No. 61/990,169, filed on May 8, 2014, provisional application No. 61/990,170, filed on May 8, 2014, provisional application No. 61/990,172, filed on May 8, 2014.

(51) Int. Cl.
| | |
|---|---|
| *G05B 19/418* | (2006.01) |
| *G05B 19/409* | (2006.01) |
| *G05B 19/042* | (2006.01) |
| *G05B 11/01* | (2006.01) |

(52) U.S. Cl.
CPC ....... *G05B 19/0426* (2013.01); *G05B 19/409* (2013.01); *G05B 19/418* (2013.01); *G05B 19/4183* (2013.01); *G05B 23/0216* (2013.01); *G05B 23/0272* (2013.01); *G05B 2219/25387* (2013.01); *G05B 2219/25407* (2013.01); *G05B 2219/31368* (2013.01); *G05B 2219/31472* (2013.01); *G05B 2219/35472* (2013.01); *G05B 2219/39447* (2013.01); *Y02P 90/02* (2015.11)

(58) Field of Classification Search
USPC .......................................................... 700/17
See application file for complete search history.

(56) References Cited

U.S. PATENT DOCUMENTS

| | | | |
|---|---|---|---|
| 2013/0151996 A1* | 6/2013 | Nario | G06F 8/38 715/760 |
| 2013/0310089 A1* | 11/2013 | Gianoukos | H04W 4/21 455/466 |

FOREIGN PATENT DOCUMENTS

| | | |
|---|---|---|
| CN | 102906957 A | 1/2013 |
| CN | 103176582 A | 6/2013 |
| CN | 103576819 A | 2/2014 |

OTHER PUBLICATIONS

Search report issued by China Intellectual Property Office for Chinese application No. CN201811452271.5, dated Jun. 9, 2021.

\* cited by examiner

AUTOMATION INTERFACE

CROSS-REFERENCE TO RELATED APPLICATIONS

This Application claims the benefit of U.S. application Ser. No. 15/306,954 filed Oct. 26, 2016, PCT Application PCT/US2015/029907 filed May 8, 2015, U.S. application Ser. No. 14/705,421 filed May 6, 2015 and issued as U.S. Pat. No. 10,048,670 on Aug. 14, 2018, U.S. Provisional Application 61/990,148 filed May 8, 2014, U.S. Provisional Application 61/990,151 filed May 8, 2014, U.S. Provisional Application 61/990,156 filed May 8, 2014, U.S. Provisional Application 61/990,158 filed May 8, 2014, U.S. Provisional Application 61/990,159 filed May 8, 2014, U.S. Provisional Application 61/990,163 filed May 8, 2014, U.S. Provisional Application 61/990,169 filed May 8, 2014, U.S. Provisional Application 61/990,170 filed May 8, 2014, and U.S. Provisional Application 61/990,172 filed May 8, 2014, which are each hereby incorporated by reference in their entirety.

TECHNICAL FIELD

The present disclosure relates generally to operating and managing automated equipment, including collecting and capturing automation data using an automation controller in communication with a computing device.

BACKGROUND

A facility may include multiple machines. Each machine can be controlled by a programmable logic controller (PLC) or similar controller connected to multiple machine elements, power sources and sensors of the machine, to operate the machine in an automated mode. The controller in communication with the sensors receives sensor inputs to the controller indicating condition states of the various elements. The controller may be programmed to scan at a predetermined frequency through a scan cycle, defined for example, by a sequence of operations (SOP) to be performed by the elements of the machine, and, based on the sensor inputs and condition states received by the controller, selectively energize the power sources to actuate the elements to perform operations defined by the program. Each machine and its associated controller may be operated independently from each other machine. A snapshot of machine operating data, including timing data, collected at a historical point in time, may be displayed for monitoring on a user interface, for example, connected to the machine controller. The machine can be controlled by the machine controller in one of an automated mode and a manual mode, where operator input to the machine controls are typically inputted by an operator to a control panel which is physically attached to the machine or the machine controller to restrict the location of the operator when the machine is in operation.

SUMMARY

An automation operating and management system is provided which consolidates and analyzes inputs from multiple machines within an automated enterprise, and displays inputs received from the multiple machines using a user interface of a user device. In one example, the user interface can include a touch screen of a portable user device displaying a machine control interface including one or more graphical control elements. The machine control interface can be a machine control interface for a specific station, a specific element, a specific machine, a group of elements, a group of stations, a group of machines and/or a zone including multiple elements, stations and/or machines, etc. The graphical control elements are arranged relative to the machine control interface such that a user can intuitively access data displayed for the machine operation and/or control a machine operation by activation and/or manipulation of one or more of the graphical control elements defined by the machine control interface displayed on the touch screen.

In one example, a system for controlling automation is provided which includes a machine in communication with a network. The machine collects data generated by performance of at least one operation by the machine and transmits the collected data to a network. A user device is in communication with the network to receive a machine control interface (MCI) corresponding to the machine, where the user device includes a touch interface for display of the MCI. The MCI displays the collected data to the touch interface, and defines at least one touch activated user interface element (UIE) for manipulating the data displayed by the MCI.

The operation performed by the machine can be one of a sequence of operations (SOP) performed by the machine such that the data collected can include at least one of a baseline cycle time for the operation and an actual cycle time for performance of the operation. In one example, the MCI displays the sequence of operations including the at least one operation, and further displays at least one of a baseline cycle indicator displaying the baseline cycle time of the at least one operation and an actual cycle indicator displaying the actual cycle time of the at least one operation. The MCI can display the baseline cycle indicator and/or the actual cycle indicator in one of an SOP timeline display and a machine heartbeat display. In one example, at least one UIE defined by the MCI is defined by one of the operations displayed in the sequence of operations. In another example, at least one UIE is defined by the at least one of the baseline cycle indicator and the actual cycle indicator. The collected data can be viewed and/or manipulated, and additional information can be displayed by the MCI, by a touch input to the UIE by a user of the user device.

In one example, the user device can be enabled as an automation human machine interface (HMI) device for controlling at least one operation performed by the machine, such that a touch action applied to at least one UIE defined by the MCI controls the operation. The automation HMI device can include an enabling switch connected to the user device where activation of the enabling switch is a prerequisite condition to enabling the user device as an automation HMI device. The MCI can be stored in a memory of the enabling switch such that the MCI is retrieved from the enabling switch by the user device. In an illustrative example, at least one UIE is defined by one of the baseline cycle indicator and the actual cycle indicator, such that a touch action applied to the UIE as a sliding pressure in a first direction actuates performance of the operation to a conclusion or end condition of the operation, and such that a touch action applied to the UIE as a sliding pressure in a second direction opposing the first direction actuates performance of the operation to a start of the operation. In one example, the enabling switch includes a trigger and a connector for connecting the enabling switch to a user device, such that the user device is enabled as an automation human machine interface (HMI) device for controlling the at least one operation when the enabling switch is connected to the user device and the trigger is manually activated by a user.

In one example, an enabled area is defined by the location of the machine, and the automation HMI device is enabled to control the machine when the automation HMI device is located within the enabled area. The automation HMI device is disabled from controlling the machine when the automation HMI device is located outside the enabled area. The enabling switch can include a location device for determining a location of the enabling switch relative to the enabled area. The system can include another location device for use in determining the enabled area, and such that the location device of the enabling switch can selectively communicate with the other location device to determine the location of the automation HMI device relative to the enabled area. In one example, the location devices are each radio frequency identification (RFID) devices. In another example, the location device included in the enabling switch is a global positioning system (GPS) device.

The machine can be selectively operated in an operating mode which is one of an automated mode and a manual mode. In one example, the automation HMI device is enabled to control the machine when the machine is operated in the manual mode, and is disabled from controlling the machine when the machine is operated in the automatic mode. The automation HMI device can be in communication with the machine to determine the operating mode of the machine.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Figure 1:
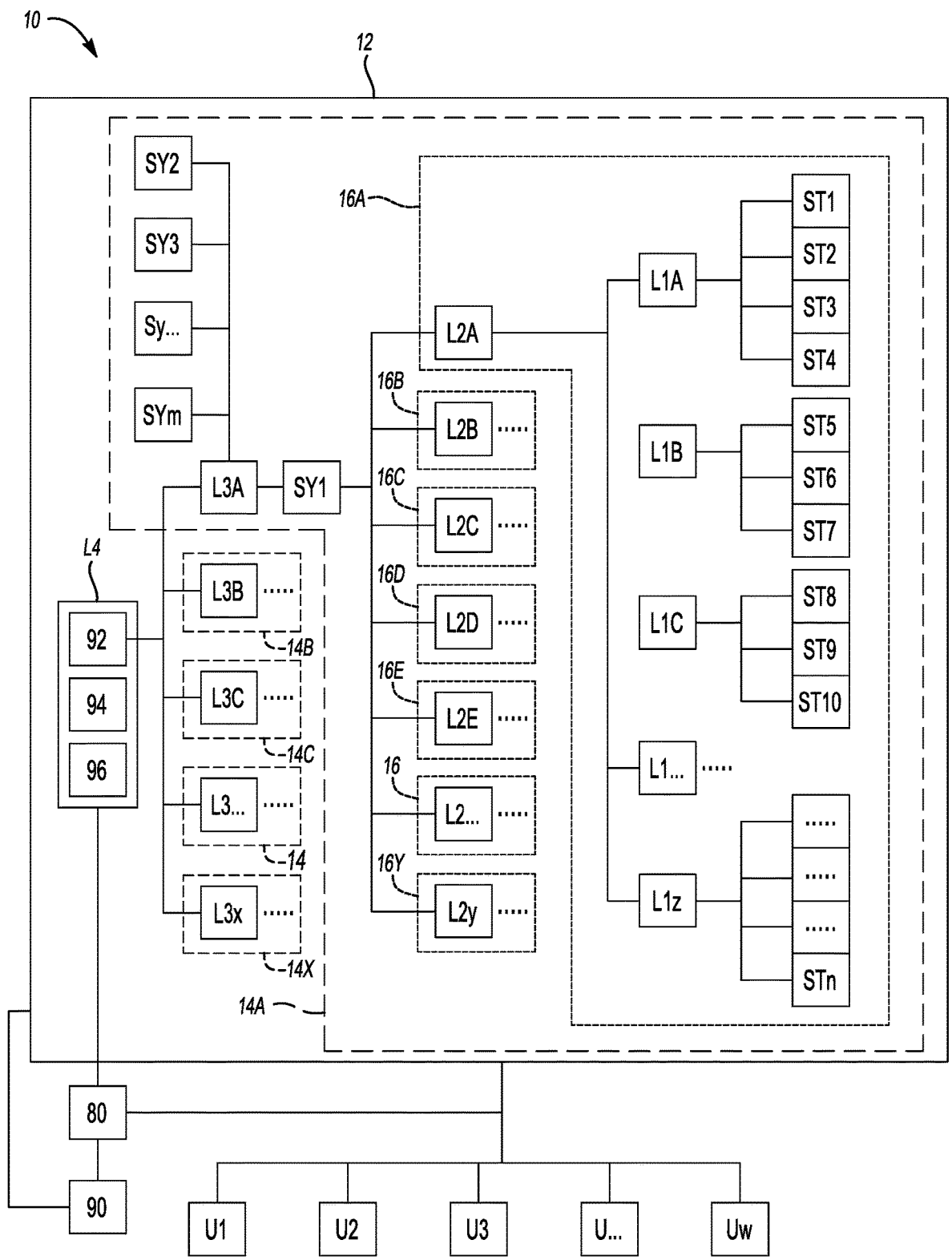
FIG. 1 is a schematic view of an example of an automation operating and management system including first, second, third and fourth level controllers.

Referring to the drawings wherein like reference numbers represent like components throughout the several figures, the elements shown in FIGS. 1-13 are not to scale or proportion. Accordingly, the particular dimensions and applications provided in the drawings presented herein are not to be considered limiting. FIG. 1 shows an automation operating and management system 10 for controlling systems, machines, and elements operating within an enterprise 12. The automation operating and management system 10 may be referred to herein as an automation operating system (AOS). The enterprise 12 includes an enterprise server L4, which may also be referred to herein as a fourth layer server, for receiving and consolidating data from multiple facilities 14 (shown in the example of FIG. 1 as facilities 14A . . . 14x and referred to herein collectively as facilities 14) within the enterprise 12. Each of the facilities 14 includes a facility server L3, which may also be referred to herein as a third layer server, for receiving and consolidating data from multiple facility systems SY (shown in the example of FIG. 1 as systems SY1 . . . SYm and referred to herein collectively as systems SY) within each of the facilities 14. Each facility server L3 is in communication with the enterprise server L4. At least one of the facility systems SY in each of the facilities 14 (shown in the example of facility 14A as system SY1) includes multiple machines 16 (shown in the example of FIG. 1 as machines 16A . . . 16y and referred to herein collectively as machines 16). The machines 16 can be any machines that perform coordinated operations including automated machines. In an illustrative and non-limiting example described herein the machines 16 can be machines such as automated machines performing operations in a manufacturing plant and/or an assembly facility. The enterprise server L4 can be embodied as one or more computer devices having a processor 94 and a memory 92, some of which is computer-readable tangible, non-transitory memory arranged on a printed circuit board or otherwise available to the processor 94. Instructions embodying the methods described herein may be programmed into memory 92 and executed as needed via the processor 94 to provide functionality of the AOS 10 as described herein. The memory 92 may include, by way of example, sufficient read only memory (ROM), optical memory, flash or other solid state memory, and the like. Transitory memory such as random access memory (RAM) and electrically-erasable programmable read-only memory (EEPROM) may also be included, along with other required circuitry (not shown), including but not limited to a high-speed clock, current/voltage/temperature/speed/position sensing circuitry, analog-to-digital (A/D) circuitry, digital-to-analog (D/A) circuitry, a digital signal processor, and any necessary input/output (I/O) devices and other signal conditioning and/or buffer circuitry. The enterprise server L4 can include a communications interface 96 for communication with other controllers and/or servers in the enterprise 12, including for example, for communication with each of a third layer server L3, a second layer controller L2 and a first layer controller L1 of the enterprise 12. The fourth layer (enterprise) server L4, third layer servers L3, second layer controllers L2 and first layer controllers L1 can be in communication with each other via a network 80, which may be a wired or wireless network.

AOS 10 can include a data storage memory 90 which can be used to store data received from one or more of the fourth layer server L4, third layer servers L3, second layer controllers L2 and first layer controllers L1. By way of example, the data storage memory 90 may be accessed via the network 80 and/or may be external to the enterprise 12, for external data storage. The data storage memory 90 can be accessible via the enterprise server L4 and/or via the network 80. The data storage memory 90 can include, by way of example, sufficient read only memory (ROM), optical memory, flash or other solid state memory, and the like to store data received from the enterprise 12. Transitory memory such as random access memory (RAM) and electrically-erasable programmable read-only memory (EEPROM) may also be included, along with other required circuitry (not shown), including but not limited to a high-speed clock, analog-to-digital (A/D) circuitry, digital-to-analog (D/A) circuitry, a digital signal processor, and any necessary input/output (I/O) devices and other signal conditioning and/or buffer circuitry.

AOS 10 can further include one or more user devices (shown in the example of FIG. 1 as user devices U1 . . . Uw and referred to herein collectively as user devices U) in communication with the enterprise 12, via a wired connection or a wireless connection, for example, via the network 80. By way of non-limiting example, a user device U can be a computing device such as a personal computer, tablet, laptop, smart phone, personal digital assistant, or other personal computing device for viewing information including data related to and/or provided by the enterprise 12. In one example, the user device U can display a machine control interface for one or more of the machines 16. The user device U can include a user interface such as a touch screen for interacting with the information and data of the enterprise 12 and/or for controlling the machine 16 via the machine control interface.

In the example shown, each of the machines 16 includes a second layer controller L2 and one or more first layer controllers L1. Each of the machine controllers L2 (shown in the example of FIG. 1 as machine controllers L2A . . . L2y and referred to herein collectively as machine controllers L2) within a respective facility 14 are in communication with the respective facility controller L3 for that facility 14. A second layer controller L2 may also be referred to herein as a machine controller. Each machine controller L2 of a respective machine 16 is in communication with the first layer controllers L1 of that respective machine. A first layer controller L1 may be referred to herein as a base layer controller. The machine controllers L2 and the base layer controllers L1 can each perform specific functions in controlling and monitoring the operation of the machine 16. Each machine controller L2 and each base layer controller L1 can be embodied as one or more computer devices having a processor and memory, some of which is computer-readable tangible, non-transitory memory arranged on a printed circuit board or otherwise available to the processor. Instructions may be programmed into the memory of each of the machine controllers L2 and each of the base layer controllers L1 and executed as needed via the processor of the respective controller L2, L1 to provide the control functionality over the machines 16 and/or elements E within the control of each respective machine controller L2 and/or each respective base layer controller L1. The memory of each machine controller L2 and each base layer controller L1 can include, by way of example, sufficient read only memory (ROM), optical memory, flash or other solid state memory, and the like. Transitory memory such as random access memory (RAM) and electrically-erasable programmable read-only memory (EEPROM) may also be included, along with other required circuitry (not shown), including but not limited to a high-speed clock, current/voltage/temperature/speed/position sensing circuitry, analog-to-digital (A/D) circuitry, digital-to-analog (D/A) circuitry, a digital signal processor, and any necessary input/output (I/O) devices and other signal conditioning and/or buffer circuitry. Each machine controller L2 and each base layer controller L1 can include one or more monitoring, measuring and/or control devices for monitoring, measuring and/or controlling the machines 16 and/or elements E within the control of each respective machine controller L2 and/or each respective base layer controller L1.

Figure 2:
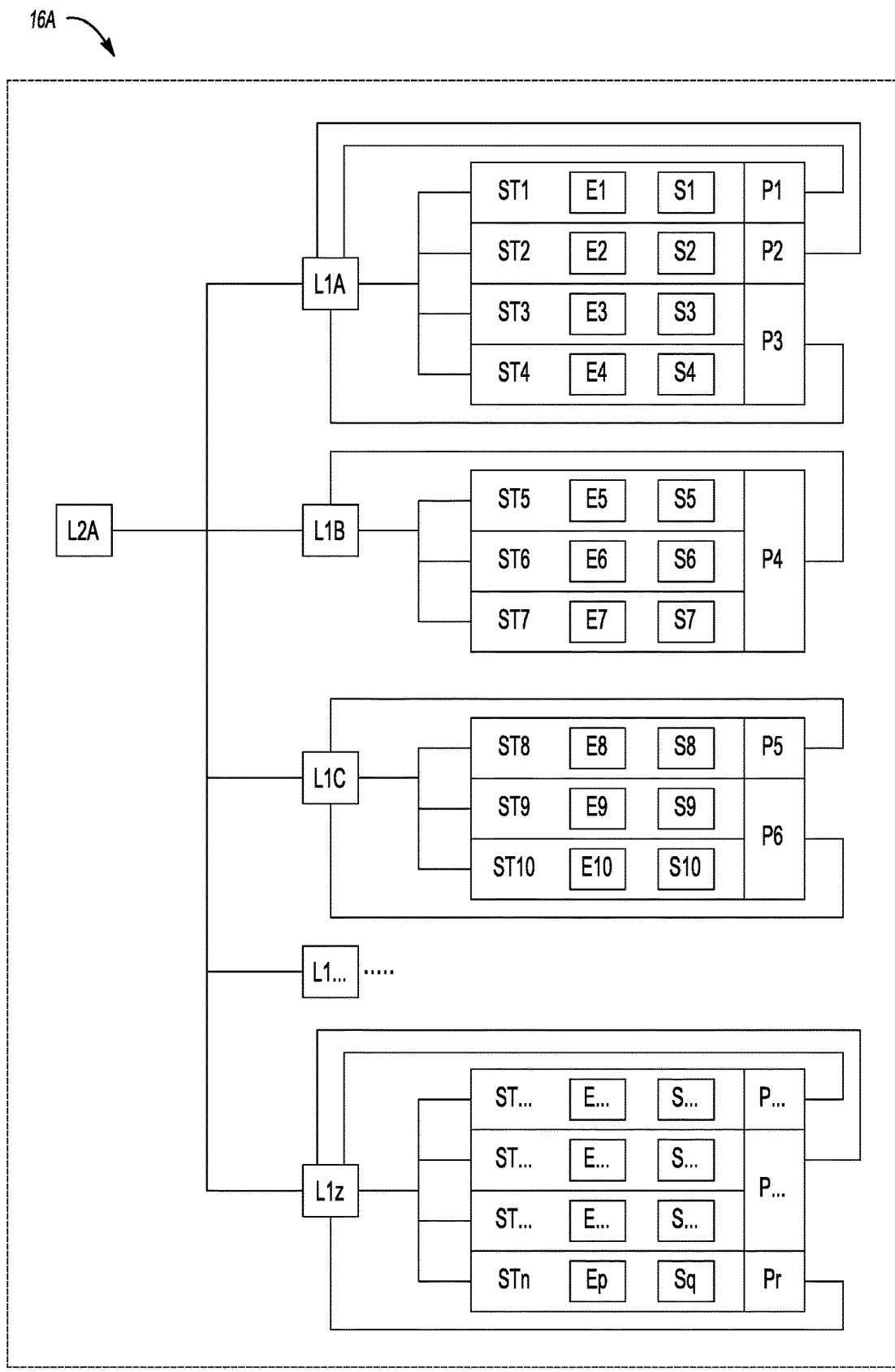
FIG. 2 is a schematic view of an example of a machine including a first level controller and a second level controller.

Each machine 16 includes a plurality of stations ST (shown in the example of FIGS. 1 and 2 as stations ST1 . . . STn and referred to herein collectively as stations ST) for performing an operational cycle of the machine 16, where the operational cycle includes operations of the machine 16 performed in a predetermined sequence controlled by the base layer controller L1 and/or the machine controller L2 of the machine 16. The predetermined sequence in which the operations in the operational cycle is performed can be defined by a sequence of operations 39 and/or a portion of a sequence of operations 39 defined for that machine 16 by the machine controller L2 of the machine 16. It would be understood that the machine 16 would, in operation, repeatedly perform the operational cycle comprising the sequence of operations 39 under control of the machine controller L2 and/or the base layer controller L1.

Each of the base layer controllers L1 (shown in the example of FIGS. 1 and 2 as base layer controllers L1A . . . L1z and referred to herein collectively as the base layer controllers L1) controls operations performed by at least one of the stations ST in communication with the respective base layer controller L1. As shown in FIG. 2, each station ST includes one or more elements E (shown in the example of FIG. 2 as elements E1 . . . Ep and referred to herein collectively as elements E), for performing various operations and/or tasks of the respective station ST. Using an illustrative example of a manufacturing and/or assembly enterprise 12, examples of elements E used to perform the various operations of a manufacturing and/or assembly operation performed by a machine 16 and/or station ST can include clamps, cylinders, collets, pins, slides, pallets, etc., where the examples provided herein are non-limiting.

Each station ST further includes one or more power sources P (shown in the example of FIG. 2 as power sources P1 . . . Pr and referred to herein collectively as power sources P), for providing power to one or more elements E and for selectively energizing a respective element E in response to a signal from the base layer controller L1. Each station ST further includes one or more sensors S (shown in the example of FIG. 2 as sensors S1 . . . Sq and referred to herein collectively as sensors S), for sensing a state of at least one of the elements E and the power source P of the station ST and providing an input to the base layer controller L1 indicating the state sensed by the sensor S.

A state, which may be referred to as a condition state or as a condition, as used herein, refers to a state of the object, a condition, a status, a position, or other property being monitored, measured and/or sensed. Non-limiting examples of condition states including cycle start time, cycle stop time, element start time, element travel, element stop time, position of an element or object, a dimensional measurement of an object which can include a dimensional measurement of a feature of an element E, a feature of a machine 16, a feature of a workpiece (not shown) to which an operation is being performed by a machine 16 or an element E, a condition of one or more of an element E, machine 16 or workpiece, or a condition of the environment within the facility 14. A condition state could further include for example, operating conditions such as on, off, open, closed, auto, manual, stalled, blocked, starved, traveling, stopped, faulted, OK, good, bad, in tolerance, out of tolerance, present, not present, extended, retracted, high, low, etc., and can include for example, a measure of a physical property such as chemistry, temperature, color, shape, position, dimensional conditions such as size, surface finish, thread form, functional parameters such as voltage, current, torque, pressure, force, etc., such that it would be understood that the terms state, condition and/or condition state as describing inputs to the AOS 10 are intended to be defined broadly. By way of non-limiting example, a sensor S may be configured as a limit switch, a proximity switch, a photo eye, a temperature sensor, a pressure sensor, a flow switch, or any other type of sensor which may be configured to determine if one or more states are met during operation of the automated system 10, and to provide an output to the at least one automation controller, such as the base layer controller L1 and/or the machine layer controller L2, which is received by the controller L1, L2 as an input corresponding to the state determined by the sensor S. The sensor S output may be configured, for example, as a signal provided to the base layer controller L1 and/or to the machine layer controller L2, and received by the base layer controller L1 and/or to the machine layer controller L2 as an input including input data. The sensor S may be configured to provide a discrete or bit-form output. The sensor S may be configured as an analog sensor and may provide an analog output signal corresponding to one or more of multiple states of a element E or a group of elements E associated with the sensor S, or one or more of multiple states of an environment of the machine 16 and/or the environment of the facility 14 including the machine 16.

The predetermined sequence of operations in the operational cycle can be defined by a sequence of operations 39 and/or a portion of a sequence of operations 39 defined for that machine 16 by the machine controller L2 of the machine 16. In one example, the machine controller L2 can perform the functions of the machine controller L2 and the base layer controllers L1, such that the machine 16 can be configured without the base layer controllers L1. In this example, the machine 16 would, in operation, repeatedly perform the operational cycle comprising the sequence of operations 39 under the independent control of the machine controller L2.

In another example, the controller functions may be divided between the base layer controllers L1 and the machine controller L2, with the base layer controllers L1 functioning as low level controllers and the machine controllers L2 functioning as a high level controller coordinating the operation of the base layer controllers L1 within the machine 16. In this example, the machine 16 would, in operation, repeatedly perform the operational cycle comprising the sequence of operations 39 under the control of the machine controller L2 and the base layer controllers L1, where the machine controller L2 acts as a data collector collecting the condition state data for each of the elements E of the machine 16 from each of the respective base layer controllers L1, and acts as a local area controller to coordinate and control the interaction of the base layer controllers L1 with each other. In this example, each base layer controller L1 within the machine 16 is in communication with each other base layer controller L1 within the machine 16 and with the machine controller L2 to communicate condition states of each of the elements E controlled by that respective base layer controller L1, such that each base layer controller L1 can execute control actions of the respective elements E under the control of the respective base layer controller L1 in response to the condition state data received from the other base layer controllers L1 in the machine 16.

For illustrative purposes and by way of non-limiting example, the enterprise 12 shown in FIGS. 1 and 2 may be a production enterprise including a plurality of manufacturing and/or assembly facilities 14, such as facilities 14A, 14B and 14C. In one example, the facilities 14A, 14B and 14C may be co-located within the production enterprise 12, for example, each of the facilities 14A, 14B and 14C may be sub-factories or assembly lines co-located in a larger building defining the production enterprise 12. In another example, each of the facilities 14A, 14B and 14C may be a stand-alone factory which may be geographically separated from each other and in communication with each other and the enterprise server 12, for example, via the network 80. Facility 14A, for illustrative purposes, is shown in additional detail in FIGS. 1 and 2, and includes a facility server L3A which is in communication with multiple systems SY such as systems SY1, SY2 and SY3 operating in the facility 14A. In the example shown, system SY1 includes manufacturing and/or assembly operations consisting of multiple machines 16 such as machines 16A, 16B, 16C, 16D and 16E.

In the illustrative example, machine 16A is shown in additional detail in FIG. 2, consisting of multiple stations ST such as stations ST1 through ST10. Machine 16A includes a machine controller L2A in communication with multiple base layer controllers L1 such as base layer controllers L1A, L1B and L1C. Each of the base layer controllers L1A, L1B and L1C acts to control multiple stations ST according to instructions received from the machine controller L2A, to perform operations, for example, defined by a sequence of operations 39 stored in the machine controller L2A. For example, as shown in FIG. 2, base layer controller L1A can control the operations of stations ST1, ST2, ST3, ST4 by selectively activating the power sources P1, P2 and P3 to selectively actuate elements E1, E2, E3 and E4. The base layer controller L1A receives sensor outputs from the sensors S1, S2, S3 and S4 which indicate condition states, for example, of the elements E1, E2, E3 and E4. The base layer controller L1A is in communication with base layer controllers L1B and L1C in the present example, and receives condition state input from base layer controllers L1B and L1C indicating the condition states of elements E5 through E10. The base layer controller L1A selectively actuates the elements E1, E2, E3 and E4 according to instructions stored in the memory of the base layer controller L1A, inputs and instructions received from the machine controller L2A and in response to the condition states of the elements E1 through E10, in the present example, received by the base layer controller L1A. The examples described herein and shown in FIGS. 1 and 2 related to machine 16A are illustrative and non-limiting. For example, each of the machines 16 controlled and/or managed by AOS 10 could include a machine controller L2, however could differ in including a base layer controller L1 and/or the number of base layer controllers L1 included in the machine 16, and could differ in the number, arrangement, function, etc. of the stations ST, elements E, sensors S and power sources P from the illustrative example of machine 16A shown in FIGS. 1 and 2.

In the present illustrative example, facility systems SY2 and SY3 shown in FIGS. 1 and 2 can operate in the facility 14A and can be operated and/or managed using the AOS 10 in a manner and/or to provide outputs which can affect the operations of system SY1 in facility 14A, including affecting the efficiency and/or downtime of the machines 16 included in the system SY1. Each of the systems SY2, SY3 includes one or more servers (not shown, referred to herein as a SY server) which can be embodied as one or more computer devices having a processor and memory, some of which is computer-readable tangible, non-transitory memory arranged on a printed circuit board or otherwise available to the processor. Instructions may be programmed into the memory of each SY server and executed as needed via the processor of the SY server to provide monitoring and/or control functionality over the facility operations within the control of the respective SY system. The memory of the SY server can include, by way of example, sufficient read only memory (ROM), optical memory, flash or other solid state memory, and the like. Transitory memory such as random access memory (RAM) and electrically-erasable programmable read-only memory (EEPROM) may also be included, along with other required circuitry (not shown), including but not limited to a high-speed clock, current/voltage/temperature/speed/position sensing circuitry, analog-to-digital (A/D) circuitry, digital-to-analog (D/A) circuitry, a digital signal processor, and any necessary input/output (I/O) devices and other signal conditioning and/or buffer circuitry. Each of the systems SY2, SY3 can include one or more monitoring, measuring and/or control devices and/or sensors for monitoring, measuring and or sensing a state of the facility operations within the control of the respective SY system.

In the present illustrative example of a production enterprise 12, system SY2 can be a facility management system, which may be referred to herein as a facility infrastructure system SY2, for monitoring, measuring and/or controlling various factors of the infrastructure and operating environment of facility 14A, such as electrical power supply provided to the various power sources P, water supply provided to hydraulic and/or coolant systems within the facility 14A and/or coolant systems related to the machines 16, compressed air supply provided within the facility 14A, for example, to pneumatic systems of the machines 16, to pneumatically operated elements E, and/or to pneumatically controlled manual tools such as pneumatic torch wrenches which may be used in manufacturing and/or assembly operations within the facility 14A. It would be understood that variability in each of the electrical power supply, water supply, and compressed air supply could affect the operation, efficiency and downtime of one or more of the machines 16 and/or elements E. For example, a decrease in the pressure of the compressed air supply provided to a pneumatically controlled element E such as a cylinder may decrease the speed at which the cylinder element E travels, increasing the cycle time required for the cylinder element E to travel when performing an operation of a machine 16. For example, an increase in temperature of cooling water circulating in a cooling water jacket of a machine 16 such as a welding machine, may change the efficiency of heat transfer from a work area of the machine 16, affecting the tool life of the welding elements E in the machine 16 and/or the cooling rate of the welds being formed in a product welded by the machine 16. For example, variability in the voltage level of the incoming power supply provided to a power source P can affect the response time of a clamp element E activated by the power source P, thereby affecting the cycle time of the operation performed by the clamp element E. By way of example, system SY2 can monitor, measure and/or control ambient conditions within the facility 14A, or within a portion of the facility 14A, such as temperature, humidity, etc. For example, the facility 14A may be portioned into multiple zones, where at least one of the machines 16 is located in each zone. By way of example, one of the zones can include machines 16 which are performing operations sensitive to ambient temperature and/or humidity conditions, such as an electronics fabrication operation or a painting operation, such that variability in the ambient temperature and/or humidity in that zone may affect the quality of the product produced by the machines 16 in that area. These examples are non-limiting and for illustrative purposes, and it would be understood that variability within facility controlled systems and conditions such as power supply, water supply, compressed air supply, temperature, humidity, etc. can affect the operation of the machines 16, elements E and/or can affect the quality and/or condition of the products produced by and/or the services provided by the machines 16 in multiple ways too numerous to include herein. System SY2 can transmit signals (inputs) to the facility server L3A indicating condition states of the various factors of the operating environment of facility 14A being monitored, measured, and/or controlled by the facility server L3A.

In the present illustrative example of a production enterprise 12, system SY3 can include production control and product assurance operations and can monitor, measure and/or control various factors of the production control and product assurance operations which impact the operation of manufacturing and production system SY1 of facility 14A. For example, the production control operations of system SY3 can monitor inventory levels (on order, in transit, in stock) of machine parts for the machines 16, which may include replaceable service parts (motors, etc.) sensors S (limit switches, etc.) and/or elements E which can include durable (reusable) elements such as clamps, cylinders, etc. and/or consumable (replaceable) elements E such as drills, taps, clamp pads, etc. required for a station ST to complete an operation and/or for the machine 16 to operate. In another illustrative example, the production control operations of system SY3 can monitor inventory levels (on order, in transit, in stock) of vendor supplied (purchased) components and/or material which are provided to the machines 16, for example, as raw material or work pieces on which operations are performed by the machines 16, or are provided to the machines 16, for example, as components to be assembled with other components to form a finished assembly. The product assurance operation, for example, can monitor the condition of vendor supplier (purchased) components and/or materials and indicate the acceptance or rejection of the vendor supplied materials, which could affect the availability of that inventory to the machines 16. In another illustrative example, the product assurance operation can measure and output a condition state of a component or raw material to the facility server L3 and/or to a machine controller L2 of a machine 16 processing the component or raw material, such that the machine 16 in response can adjust settings based on the measured condition state of the incoming component or raw material. For example, a machine 16 may be an oven to temper components made from raw material. The machine 16 via the facility controller L3 can receive hardness data for the raw material from the product assurance system SY3 and adjust the tempering temperature of the oven based on the hardness of the raw material. These examples are non-limiting and for illustrative purposes, and it would be understood that the condition of components and/or raw material monitored and/or measured by the product assurance operations of the system SY3, the inventory levels of components and/or raw material and the availability of machine parts for the machines 16 and elements E controlled and monitored by the production control operations of the system SY3 can affect the operational efficiency and/or downtime of the machines 16 and/or elements E and/or can affect the quality and/or condition of the products produced by and/or the services provided by the machines 16 in multiple ways too numerous to include herein. System SY3 can transmit signals (inputs) to the facility server L3A indicating condition states of the various factors of the operating environment of facility 14A being monitored, measured, and/or controlled by the facility server L3A.

In the present illustrative example, the facility server L3A acts as a data collector within the AOS 10 for collecting the inputs received from the systems SY1, SY2 and SY3, and can analyze and use the accumulated data and inputs to identify and respond to operating conditions throughout the facility 14A, including implementing preventive actions to minimize downtime, efficiency losses and/or productivity losses, by controlling and modifying the operations within the facility 16A, which can include outputting commands to the machine controllers L2A through L2E and outputting commands to systems SY2 and SY3, for example, in response to condition states and inputs received from the machine controllers L2A through L2E and systems SY2 and SY3, to modify the operating conditions within the facility 14A, the sequence of operations 39 performed by the various stations ST, the machines 16 and/or stations ST used to perform one or more operations, etc., to improve efficiency, decrease and/or optimize power consumption within the facility, increase productivity, reduce or avoid downtime, etc. in response to the analysis of the data by the facility server L3A. The AOS 10 is advantaged by accumulating the data and inputs from multiple production (SY1) and non-production (SY2, SY3) systems and multiple machines within a facility 14, analyzing the accumulated data and inputs using a facility server L3 to identify issues which may not be identifiable by the independent machine controllers L2, for example where such issues may result from interactions of multiple inputs which are outside the scope of inputs controlled by any one of the machine controllers L2, and/or which may be identifiable only by combination of inputs from multiple sources (multiple machines 16, a machine 16 and system input from one or more of systems SY2, SY3, etc.), and using the AOS 10 to identify, action responses to, manage and/or prevent issues using the collective resources of the facility 14.

In the present illustrative example, the enterprise server L4 acts as a data collector for the inputs and data received from the facility servers L3A, L3B and L3C. The enterprise server L4 can analyze and use the accumulated data and inputs to control and modify the operations within one or more of the facilities 16A, 16B, 16C, 16D and 16E, including implementing preventive actions to minimize downtime, efficiency losses and/or productivity losses, by controlling and modifying the operations of one or more of the facilities 16A, 16B, 16C, 16D and 16E, in response to an issue or condition identified in one or more of the facilities 16A, 16B, 16C, 16D and 16E, which can include, for example, transferring production between facilities 16 in anticipation of or in response to a downtime event, to increase efficiency based on the operational condition of a machine 16 in one facility 14 as compared to an identical and/or substantially similar machine 16 in another facility 14, to respond to inputs received from the non-production systems SY2 and/or SY3 indicating for example, a facility power supply issue or incoming material issue, etc. The AOS 10 is advantaged by accumulating the data and inputs from facilities 14, analyzing the accumulated data and inputs using the enterprise server L4 to identify issues which may not be identifiable by the independent facility servers L3, for example where such issues may result from interactions of multiple inputs which are outside the scope of inputs controlled by or received into any one of the facility servers L3, and/or which may be identifiable only by a combination of inputs from multiple facilities L4, and using the AOS 10 to identify, action responses to, manage and/or prevent issues using the collective resources of the enterprise 12.

The examples described herein and shown in FIGS. 1 and 2 related to facility 14A are illustrative and non-limiting, and it would be understood that the facilities 14 other than facility 14A included in the enterprise 12 can each include at least one machine 16 configured similar to machine 16A to include a base layer controller L1 and a machine controller L2, however the number and configuration of each of the machines 16 may vary within a facility 14 and from one facility 14 to another facility 14, and each of the machines 16 may include elements E and sensors S arranged in stations ST other than those described for the example of machine 16A to perform operations other than those performed as described for machine 16A.

The example of an enterprise 12 including facilities 14 such as manufacturing plants and/or assembly facilities is not intended to be limiting. An AOS 10 as described herein can be applied to the control and management of any type of enterprise 12 including machines 16 performing coordinated operations, and as such it would be understood that the terms enterprise 12, facility 14, machine 16, element E and sensor S are intended to be defined broadly. By way of non-limiting example, an enterprise 12 can be an amusement park including an AOS 10, where the facilities 14 and machines 16 are defined by different areas of the amusement park and the systems SY can include, for example, a security system for the amusement park and an infrastructure system (water, power, waste disposal, etc.) of the amusement park. In such an example, an amusement ride facility 14A can include machines 16 forming the amusement rides, an admission ticketing facility 14B can include machines 16 for receiving and securing payment for tickets, a dining facility 14C can include machines 16 for providing food service, a parking facility 14C can include machines 16 for receiving parking fees and monitoring and patrolling the parking area, etc. In another non-limiting example, an enterprise 12 including an AOS 10 may be a property development, such as an office building complex, where each facility 14 includes one or more buildings within the complex, and the machines 16 operating in each facility 14 include, for example, elevators, security cameras, heating and ventilation equipment, etc.

Figure 3:
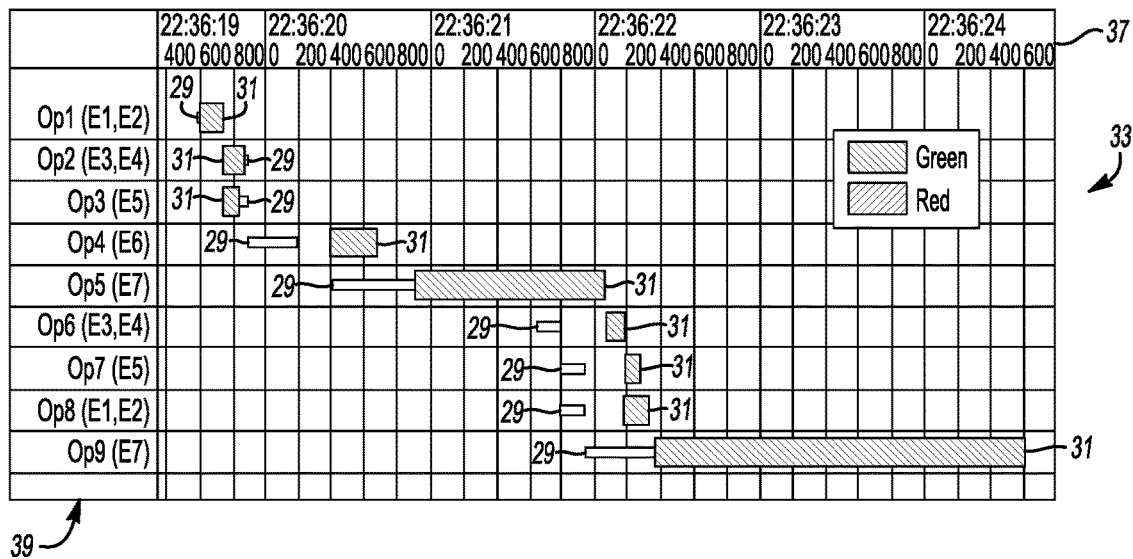
FIG. 3 is a schematic illustration of an example of a machine sequence of operations of a machine of the system of FIG. 1.
Figure 4:
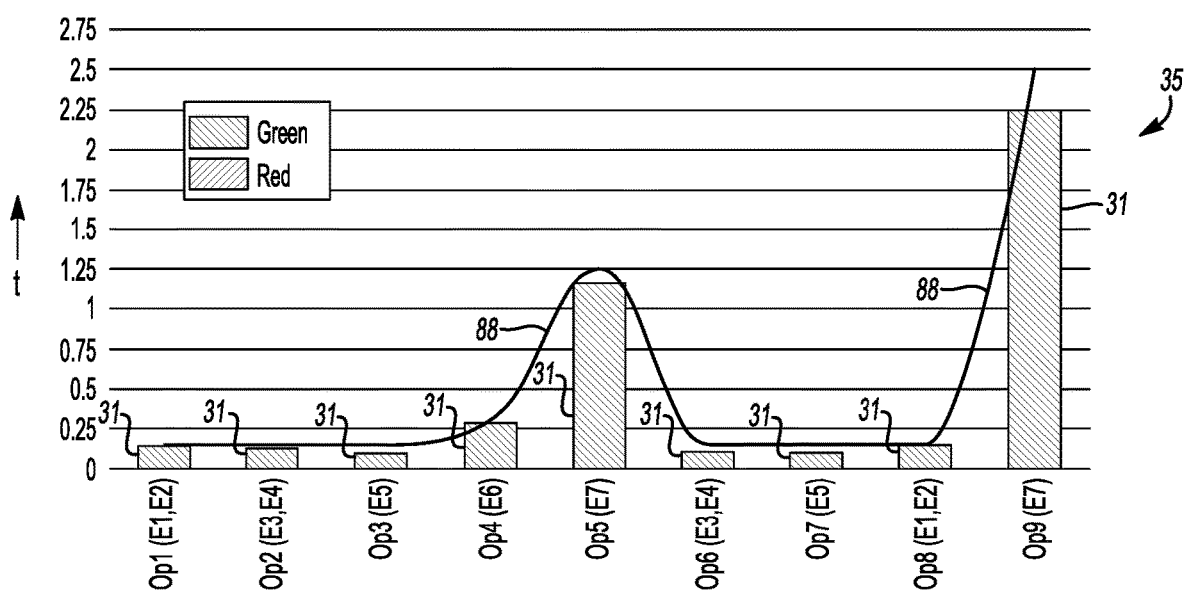
FIG. 4 is a schematic illustration of an example of a machine heartbeat of the sequence of operations of FIG. 3.

Referring now to FIGS. 3 and 4, timing data collected from one or more of the elements E, stations ST and/or machines 16 within the enterprise 12 can be displayed as shown in FIG. 3 in a traditional sequence of operation (SOP) display format 33, and/or in a heartbeat display format 35 shown in FIG. 4. The SOP display format 33 may be referred to as a SOP timeline display or as a SOP display. In the SOP display 33 shown in FIG. 3, the sequence of operations 39 corresponding to the data being displayed is listed vertically (as shown on the page), and in the present example includes operations Op1 through Op9, with operation Op1 being performed by elements E1 and E2 of a machine 16, operation Op 2 being performed by elements E3 and E4, and so on. A baseline cycle, e.g., the design intent cycle, for each of the operations Op1 . . . Op9 in the SOP 39 is graphically shown by a baseline cycle indicator 29. The actual cycle for each of the operations Op1 . . . Op9 is graphically shown by an actual cycle indicator 31. Each of the actual cycle indicators 31 may be color coded, e.g., displayed in a color defining the status of the cycle of that operation. In the example shown, the actual cycle indicators 31 are displayed in either a red or green color, with red indicating the actual cycle time is outside of a predetermined tolerance for the cycle of that operation, and green indicating the actual cycle time is within tolerance.

In the heartbeat display 35 shown in FIG. 4, the sequence of operations (SOP) 39 corresponding to the data is displayed on the horizontal axis (as shown on the page) with the actual cycle time of each operation Op1 . . . Op9 shown in heartbeat display format by an actual cycle time indicator 31, which may be color coded as previously described for FIG. 3, to indicate whether the cycle time for each respective operation is within tolerance. FIG. 4 further displays the heartbeat 88 of the sequence of operations 39, where the heartbeat 88 is determined, for example, as described in U.S. Pat. No. 8,880,442 B2 issued Nov. 14, 2014 to the inventor and incorporated by reference herein.

Figure 5:
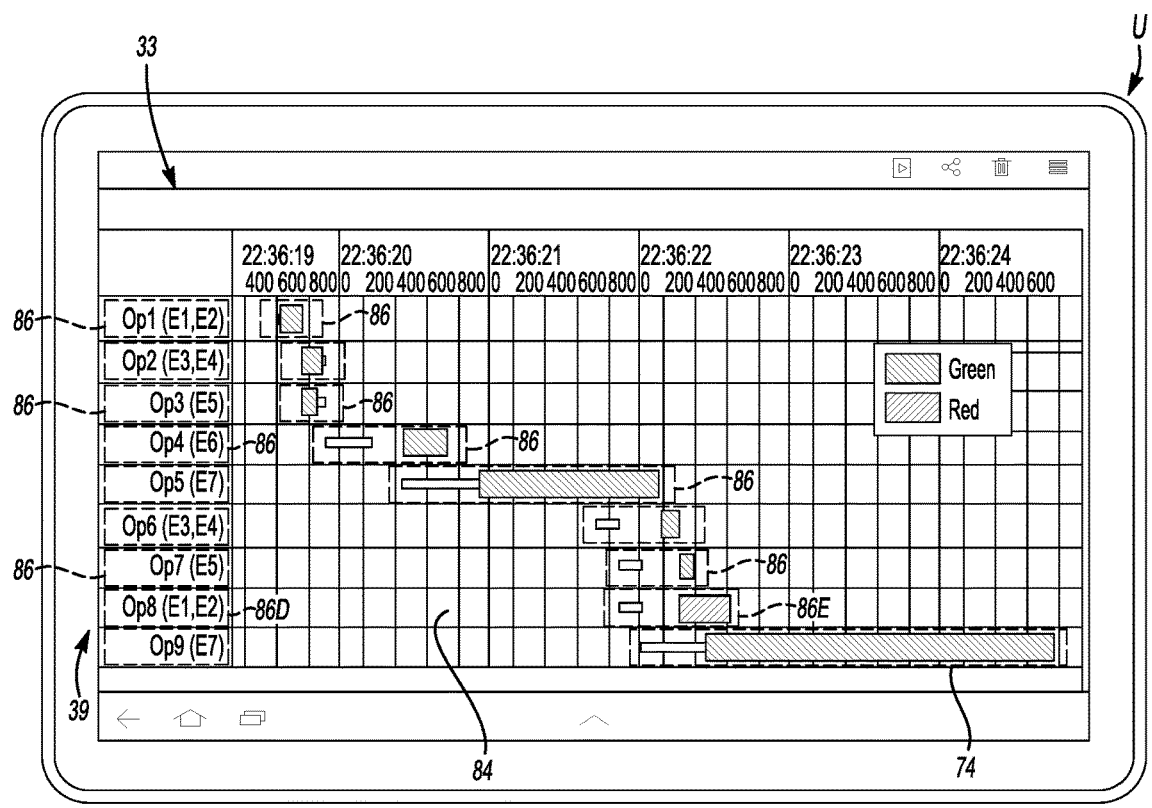
FIG. 5 is a schematic illustration of an example of a machine control interface showing the machine sequence of operations of FIG. 3 displayed on a user device.
Figure 6:
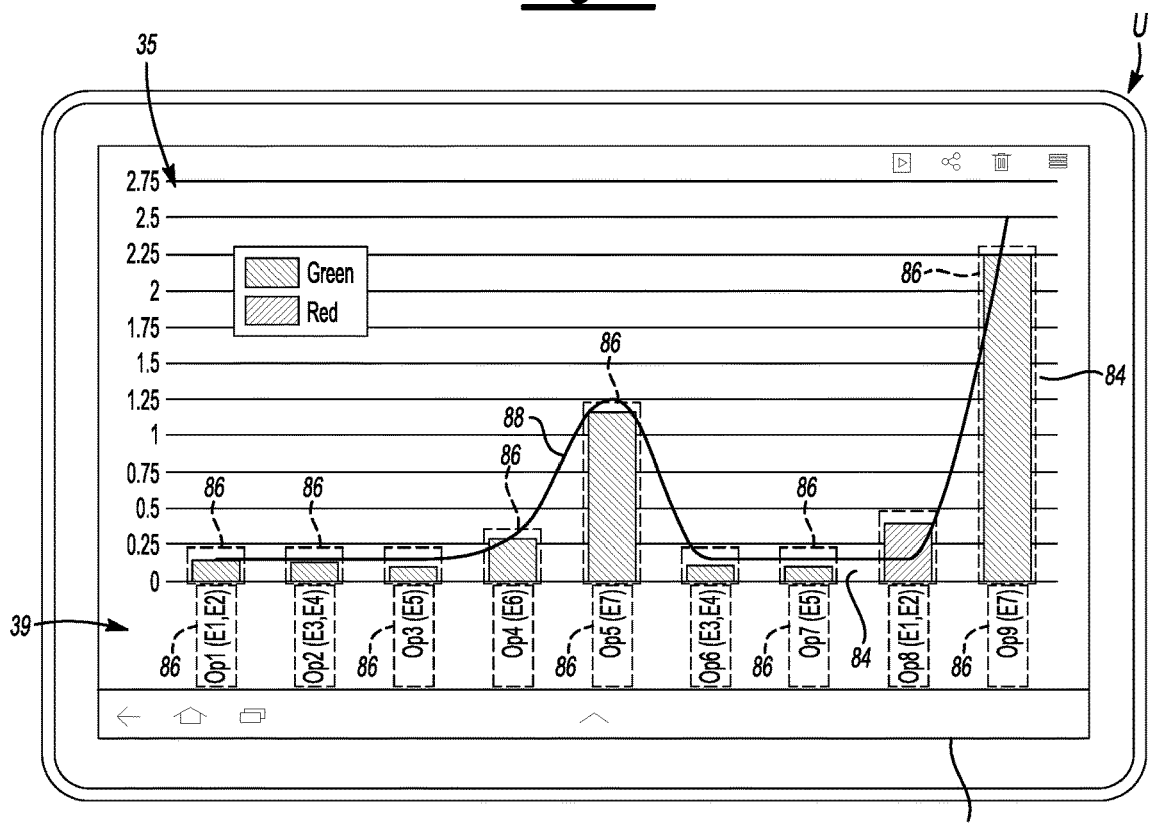
FIG. 6 is a schematic illustration of an example of a machine control interface showing the machine heartbeat of FIG. 4 displayed on a user device.
Figure 9:
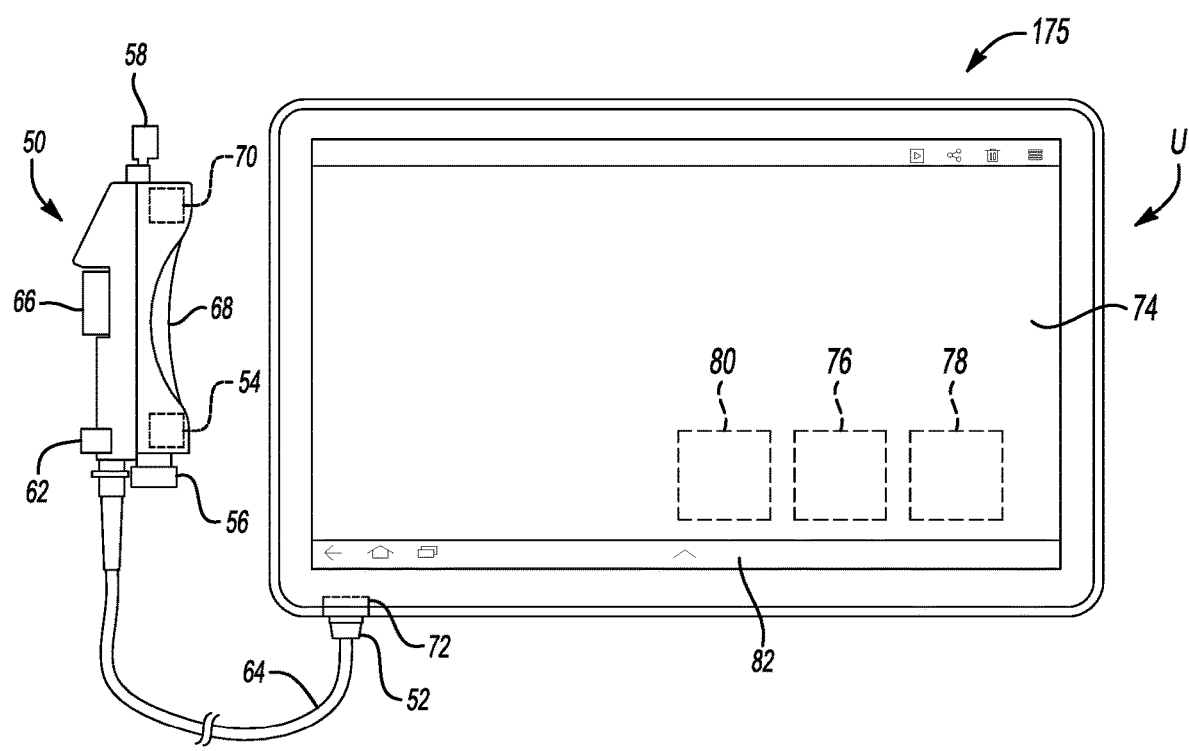
FIG. 9 is a schematic illustration of an example of a user device of FIG. 1 including an enabling switch.

As shown in FIGS. 5 and 6, the SOP display 33 and the heartbeat display 35 can each be displayed on a graphical user interface 74 of a user device U and each can be embodied as a machine control interface (MCI) 84 including one or more user interface elements (UIE) 86, also referred to herein as graphical control elements (GCE) or GCEs. The user device U can be one of a plurality of user devices U (shown in the example of FIGS. 1 and 2 as user devices U . . . Uw and referred to herein collectively as user devices U) connected to the network 80 and included in the AOS 10 to receive data from the enterprise 12. In one example, the user device U can be a portable computing device such as a personal computer, notebook, tablet, smart phone, personal data assistant, etc., including, as shown in FIG. 9, a processor 76 and memory 78, some of which is computer-readable tangible, non-transitory memory arranged on a printed circuit board or otherwise available to the processor 76. The memory 78 may include, by way of example, sufficient read only memory (ROM), optical memory, flash or other solid state memory, and the like. Transitory memory such as random access memory (RAM) and electrically-erasable programmable read-only memory (EEPROM) may also be included, along with other required circuitry (not shown), including but not limited to a high-speed clock, location sensing circuitry, analog-to-digital (A/D) circuitry, digital-to-analog (D/A) circuitry, a digital signal processor, and any necessary input/output (I/O) devices and other signal conditioning and/or buffer circuitry. The user device U can include a connector port 72 for connecting the user device U to a peripheral device. In the example shown in FIG. 9, the user device U is connected to an enabling switch 50 such that the user device U is enabled as an automation human machine interface (HMI) device 175, also referred to as an HMI control device.

The user device U includes a communications interface which can be a wireless or wired interface, for connection of the user device U to the network 80 for communication with one or more of the controllers L1, L2, the servers L3, L4, another of the user devices U, and/or the data storage memory 90. In one example, the user may subscribe to receive alerts for one or more elements E and/or machines 16 being monitored by the user, where the alerts may be received by the user on the user device U as one or more of a text message, instant message, e-mail, or other alert indicator. The user device U includes a graphical user interface (GUI) 74, which in a preferred example is a graphical touch screen or other touch-sensitive display, such that a user can provide haptic and/or tactile (touch) input to the user device 74, including commands, via the GUI 74 and/or standard tool bars 82. The GUI 74 can also be referred to herein as a touch screen 74. A touch input can be provided, by way of non-limiting example, by a touch action including user contact with touch screen 74, where user contact with the touch screen is typically, but not necessarily, made by a portion of the user's hand such as a finger or fingers, or portions thereof such as one or more fingertips or knuckles, and/or by a surface of the hand such as the side of the hand or heel of the palm. A touch action, by way of non-limiting example, can be a touch pressure, a touch motion, and/or a combination touch action including a touch pressure action and a touch motion action. A touch pressure action, which may be referred to as a touch pressure, can refer to a point pressure applied to a localized area of the touch screen 74, and typically, but not necessarily, applied by a fingertip or knuckle. A touch pressure can be characterized by a predetermined minimum pressure force which must be exerted on the touch screen 74 to be recognized by the MCI 84 and/or the touch screen 74 as an intentional touch action, e.g., where sensing the minimum pressure force differentiates the touch pressure from an incidental contact with the touch screen 74. The touch pressure can be a "touch and hold" action characterized by a point pressure which is sustained for a predetermined minimum hold time such that the touch and hold action can be recognized by the MCI 84 and/or the touch screen 74 as an intentional touch action, e.g., where sensing the minimum hold time differentiates the touch pressure from an incidental contact with the touch screen 74. The touch pressure can be a "touch and tap" action characterized by a point pressure applied in a predetermined pattern or sequence of multiple touches, such as a double tap, triple tap, etc., where the sequence of taps must be accomplished within a predetermined time interval such that the sequence of taps can be recognized by the MCI 84 and/or the touch screen 74 as an intentional touch action, e.g., where sensing the sequence of taps occurring within the predetermined time interval differentiates the touch pressure action from multiple incidental contacts with the touch screen 74. A touch motion can be characterized by a pattern of continuous contact across a predetermined area or along a predetermined path which must be exerted on the touch screen 74 by a user to be recognized by the MCI 84 and/or the touch screen 74 as touch action. In one example, a touch motion may be a slide motion along a path defined by a UIE 86, where the MCI 84 may display an indicator associated with the UIE 86. In an illustrative example shown in FIG. 7, UIE 86C defines a slide path which is associated with the baseline cycle indicator 29 and the actual cycle indicator 31 of operation Op5 displayed by the MCI 84. In the illustrative example, a touch motion along the path defined by UIE 86C activates a command, when the user device U is enabled to control the machine 16 performing the SOP 39 associated with the MCI 84, to actuate element E7 performing Op5 to a position in the cycle of Op5. For example, a slide motion in the direction of arrow 136C activates UIE 86C to actuate element E7 to condition, for example, a position, earlier in the cycle of operation Op5, as determined by the length or duration of the slide motion in the direction of arrow 136C. For example, the length or duration of the slide motion in the direction of arrow 136C can be continued until element E7 is returned to the start condition of operation Op5, for example, to a starting position for operation Op5. The example shown is non-limiting, and it would be understood that touch motions including linear and/or non-linear patterns and/or paths may be used to define a touch action. By way of example, a touch motion may include a broader motion, such as a swipe motion across the touch screen 74, to provide a user input to the MCI 84.

Data collected by AOS 10, including data collected from elements E, sensors S, machines 16, systems SY, etc. in the enterprise 12 can be displayed on the user device U using one or more machine control interfaces (MCI) 84, where each machine control interface 84 can be generated by and/or stored in the memory of one or more of a machine controller L2, a facility server L3, the enterprise server L4 and/or the data storage memory 90, and can be accessed, for example, by a user device U via the network 80, for downloading of the MCI 84 to the user device U such that a user can view data from the AOS 10 via the MCI 84 and/or interface with the MCI 84 to monitor and/or control one or more machines 16 as described herein. As shown in FIGS. 5-8, an MCI 84 can be embodied as one of the SOP display 33 of FIG. 3 and/or the heartbeat display 35 of FIG. 4. These examples are non-limiting, and it would be understood that the MCI 84 can include any arrangement of data accessible from the AOS 10 which can be displayed, and which may be enabled with one or more UIEs 86 to allow a user to interface with the MCI 84 to manipulate the data displayed on the touch screen 74 using one or more of the UIEs 86 and/or the tool bars 82. For example, MCI 84 can be a machine control interface for a specific station ST, a specific element E, a specific machine M, a group of elements E, a group of stations ST, a group of machines M and/or a zone 98 including multiple elements E, multiple stations ST and/or multiple machines M, a sequence of operations (SOP) 39 or a portion thereof, a production line, a facility 14, etc. The UIEs 86 can be arranged relative to the MCI 84 such that a user can intuitively interface with the MCI 84, for example, to activate the UIEs 86 to display additional information provided by the AOS 10. By way of non-limiting example, one or more UIEs 86 can be configured such that a user touch input to the UIEs 86 can activate the display of additional information in a pop-up window or another screen, can activate the display of a menu which may include additional UIEs 86 for selecting information, display options and/or other MCIs 84, can activate modification of the current display to show an alternate view of the MCI 84 (for example, to toggle an MCI 84 between the SOP display 33 shown in FIG. 5 and the heartbeat display 35 shown in FIG. 6) and/or can activate modification of the current display to shown condition states (such as on, off, OK, out of tolerance, etc.) or status indicators (such as stopped, blocked, starved, etc.) using one or more differentiating display features such as color coding, selective lighting and/or highlighting of portions of the MCI 84, etc.

In an illustrative example described herein, the MCI 84 and/or the UIEs 86 can be configured and/or enabled and an automation human machine interface (HMI) device 175 (see FIGS. 9 and 12) such that the user, via a touch input to the UIEs 86 of the MCI 84, can activate, manipulate and/or control a motion, action and/or operation of an element E, station ST, and/or machine 16 corresponding to the MCI 84 displayed on the touch screen 74. One or more preconditions can be required prior to enabling the user device U and the MCI 84 displayed on the user device U for use as an automation HMI device 175, which can include, for example, one or more of restricting operation of the machine 16 corresponding to the enabled MCI 84 to operating in manual mode, authenticating the user as an authorized user such as a qualified operator/programmer of the machine 16 corresponding to the enabled MCI 84, connecting an enabling switch 50 to the user device U and activating the enabling switch 50 by user contact with the enabling switch 50, etc. The automation HMI device 175 can also be referred to as an HMI control device.

Figure 10:
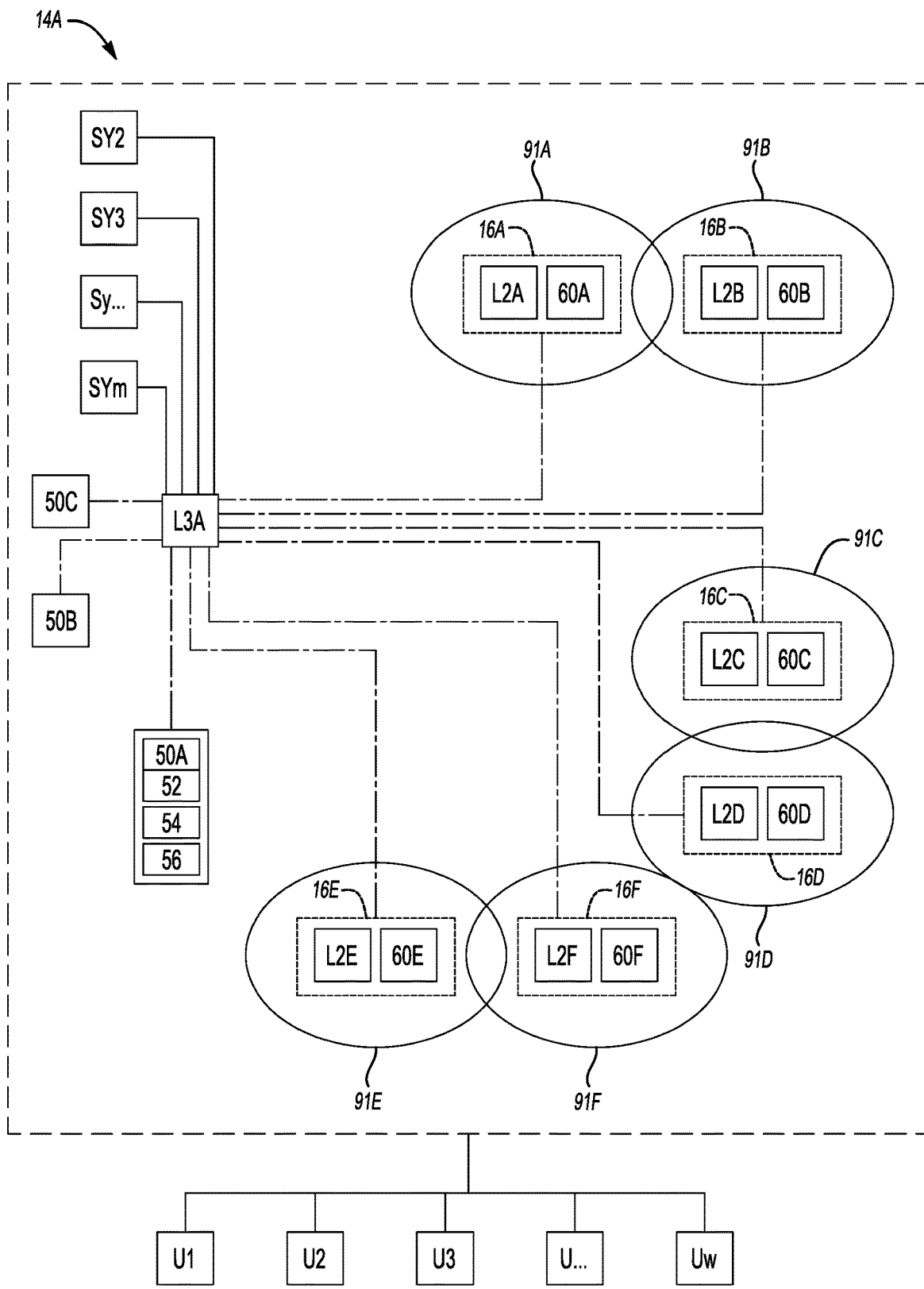
FIG. 10 is a schematic illustration of a facility management system of the system of FIG. 1, showing a plurality of machines each having an enabled area.

In the non-limiting example shown in FIG. 9, the user device U can include at least one location device 80, such as a global positioning system (GPS) transmitter/receiver and/or a radio frequency identification (RFID) transmitter/receiver, for detecting the absolute location of the user device U and/or the location of the user device U relative to, for example, another location or another location device such as a location device 60 located on a machine 16 (see FIG. 10). The location device 80 can be used to authenticate the user device U to the enterprise 12 or a portion thereof prior to allowing access by the user device U, for example, to AOS 10 and/or to the data storage memory 90 and data stored therein. In one example, the location device 80 can be used to control geographic access to AOS 10 by the user device U by allowing access by the user device U to AOS 10 only when the user device U is located within a facility 14 and/or within a predetermined space, such as an enabled area 91 of a machine 16. The location device 80 can be used to authenticate the user device U to another device including a location device, such as an enabling switch 50 including a location device 56 (see FIG. 9) and/or a machine 16 including a location device 60 (see FIGS. 10 and 11).

As shown in FIGS. 5 and 6, each of the SOP display 33 and the heartbeat display 35 is shown as an MCI 84, which can be viewed by a user to monitor the operations of the machine 16, stations ST and/or elements E performing the operations shown in the SOP 39. As shown in FIGS. 5 and 6, each of the SOP display 33 and the heartbeat display 35 MCIs 84 can be enabled with multiple UIEs 86 to allow a user to control and/or manipulate functions of a machine 16 via the MCI 84 of the user device U, and such that the touch screen 74 provides both an output interface and an input interface between the user and the user device U. The UIEs 86 respond to haptic and/or tactile (touch) contact from the user, and can be configured such that a UIE 86 can be activated by touch pressure of a user, touch motion of a user such as a sliding motion, and/or a combination of these. In the illustrative example shown, each of the operation steps Op1 through Op9 of the SOP 39 is enabled as a UIE 86, and each of the base cycle indicators 29 and/or actual cycle indicators 31 are enabled as a UIE 86.

Figure 7:
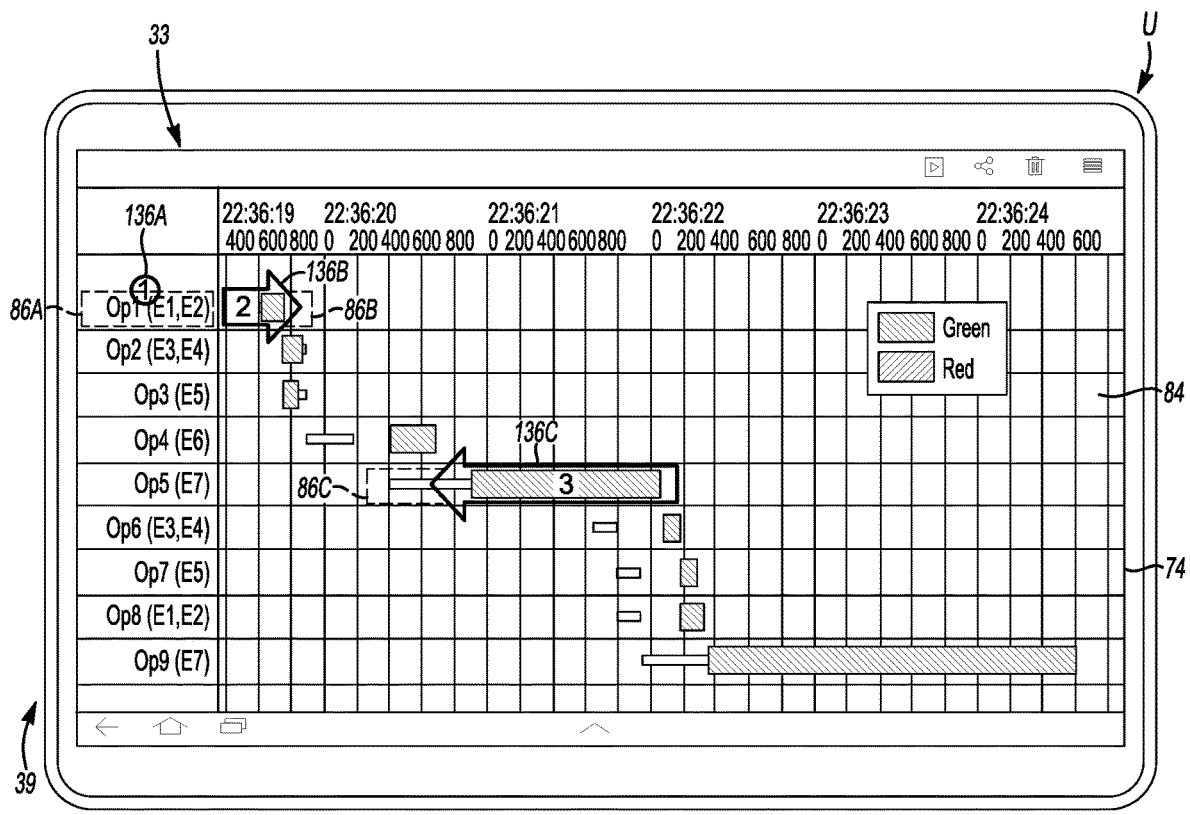
FIG. 7 is a schematic illustration of an example of a machine control interface of FIG. 5.
Figure 8:
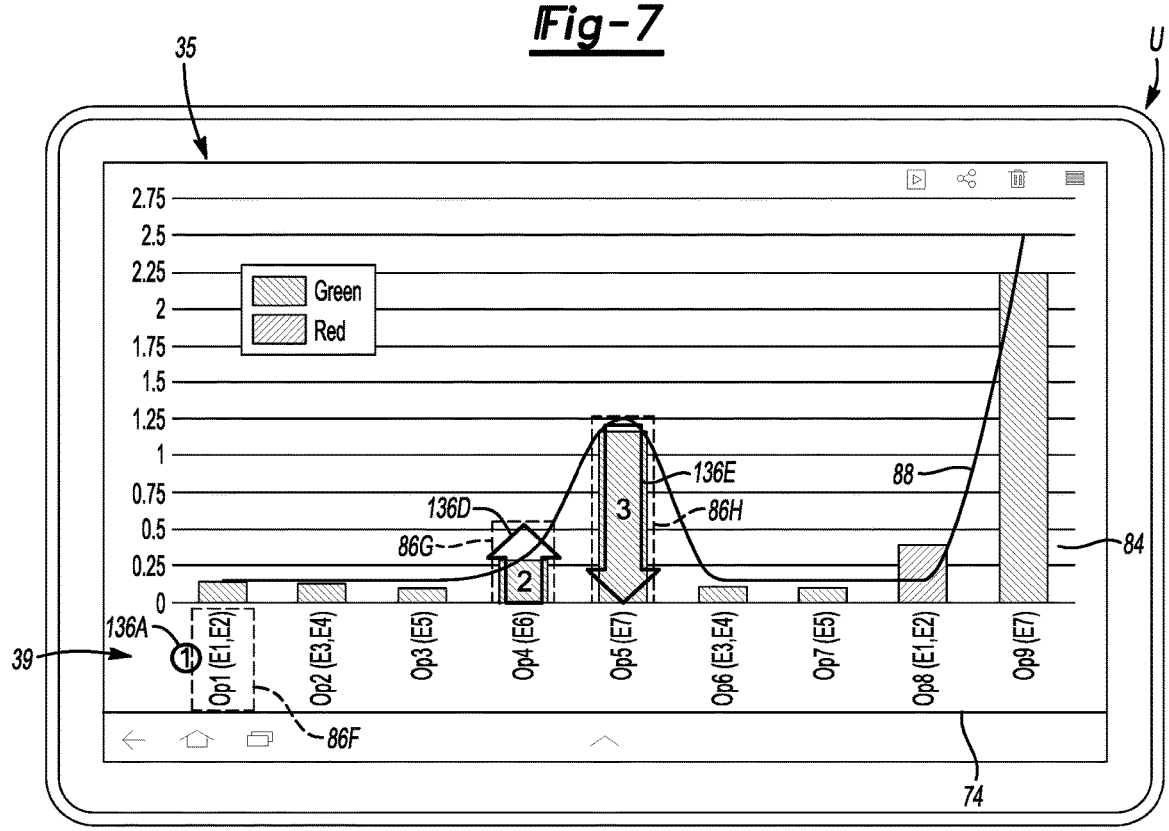
FIG. 8 is a schematic illustration of an example of a machine control interface of FIG. 6.

In addition to viewing and monitoring the conditions of a machine 16 and/or an SOP 39 being performed by the machine 16, and as shown in an illustrative example in FIGS. 7 and 8, a user can control operations of a machine 16 via the touch screen 74 by manipulating one or more of the UIEs 86. One or more preconditions can be required to allow the user to access the MCI 84 for the machine 16 and/or to control operations of the machine 16 via an MCI displayed on the touch screen 74. In one example described in further detail herein, a precondition for using the user device U to control operations of a machine 16 can include connecting an enabling switch 50 to the user device, to provide an automation HMI device 175 which requires the user to occupy both hands in the use of the HMI control device 175, e.g., with one hand activating the enabling switch 50 and the other hand manipulating the user device U and/or the MCI 84 displayed on the touch screen 74 of the user device U. In another example, the user can be required to authenticate the user as an authorized user qualified to access the MCI 84 to monitor and/or to control operations of the machine 16, via a log in procedure and/or other authentication procedure which may be accomplished, for example using the user device U. The authentication procedure may determine the level of access the user is provided via the user device U. For example, the user's access can be limited to accessing the MCI 84 for a machine 16 only for viewing and/or monitoring data related to the machine 16 including the operating condition of the machine 16, such that the user's access does not allow the user to control and/or modify operations of the machine 16, as could be the case when the user is authenticated to view data related to the machine 16 however is not qualified to control operations of the machine 16 and/or is otherwise restricted from controlling operations of the machine 16. A user, via the authentication process, can be given access to the MCI 84 and the UIEs 86 enabled to allow the user to control and/or modify operations of the machine 16, where, in an illustrative example, the user is authenticated as a service person, engineer, machine programmer or other person qualified to control the machine 16.

Figure 11:
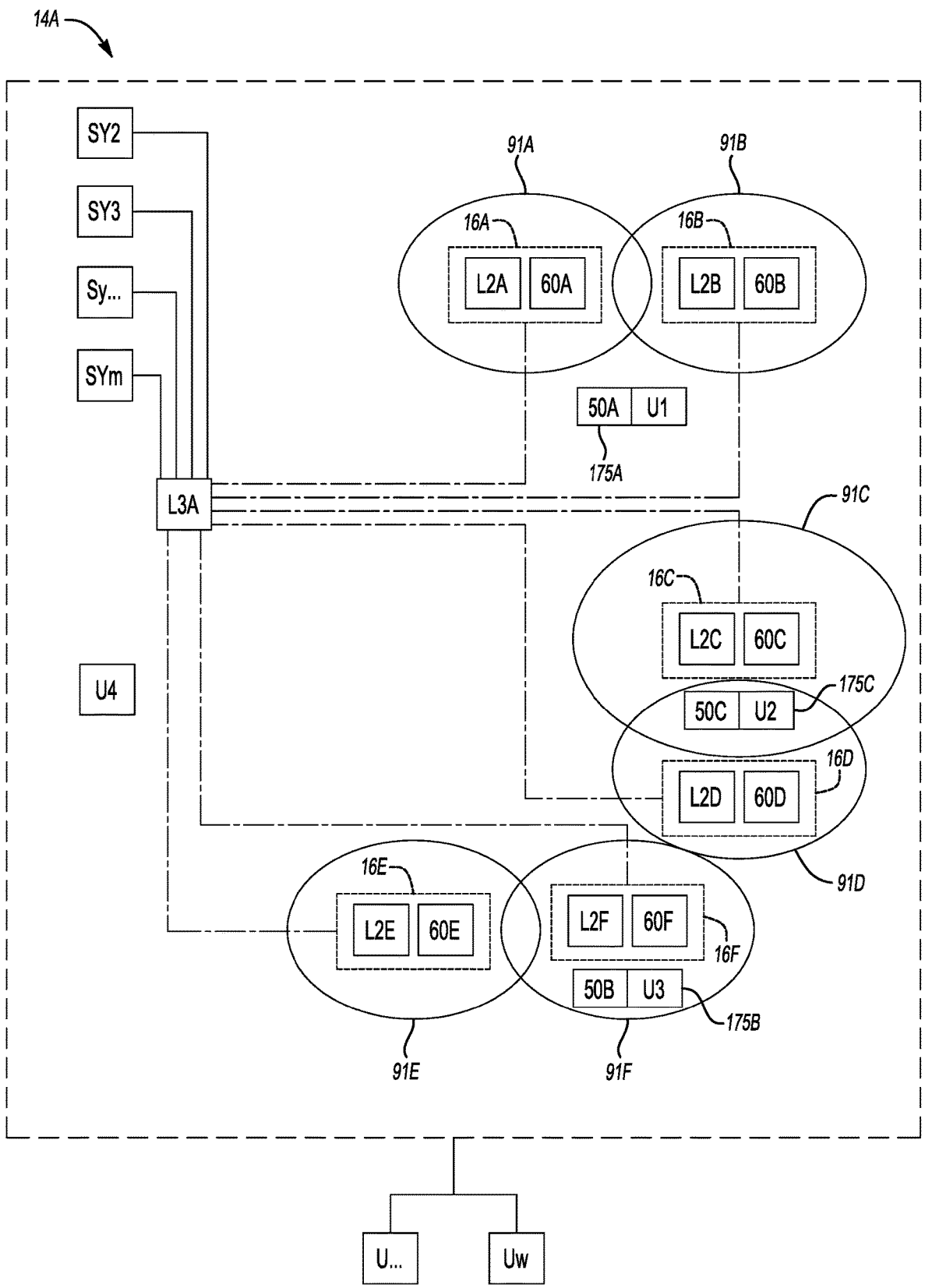
FIG. 11 is a schematic illustration of a facility management system of the system of FIG. 10.

The machine 16 can be configured, for example, via the machine controller L2 of the machine 16, such that the machine can be controlled via the MCI 84 and the user device U only when the machine 16 is being operated in manual mode. As a precondition to control operations of the machine via the touch screen 74, the user device U may be required to be within a predetermined area of the machine 16. The predetermined area can be referred to herein as a control enabled area 91 (see FIG. 10), which may vary in size and/or configuration (as shown in FIG. 11 for enabled areas 91C and 91D) for each machine 16. The control enabled area 91 defines an area in which a user device U can be enabled to control operations of a machine 16 in the enabled area 91. In one example, the enabled area may be enabled using a location device 60 installed on or in and/or otherwise located proximate to the machine 16, station ST, and/or element E being enabled for control via a user device U, where the location device 60 in communication with, for example, a location device 80 on the user device U and/or a location device 56 on a peripheral device such as an enabling switch 50 connected to the user device U, defines the enabled area 91 in which the user device U can control the respective machine 16, station ST, and/or element E associated with the respective location device 60. For example, as shown in FIG. 10, a location device 60A can be configured to define an enabled area 91A for a machine 16A, the location device 60B can be configured to define an enabled area 91B for a machine 16B, and so on.

Figure 12:
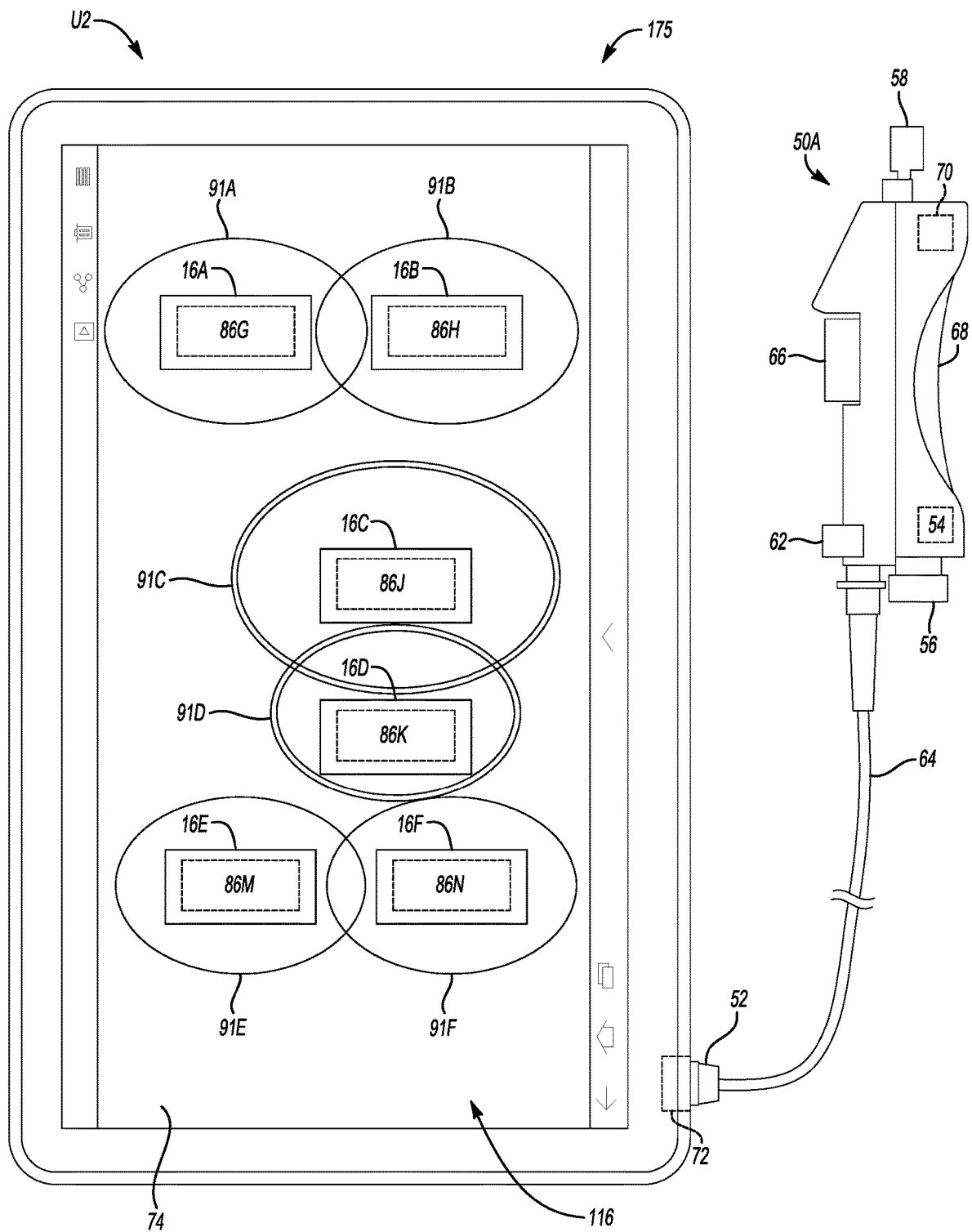
FIG. 12 is a schematic illustration of an example of the user device and enabling switch of FIG. 9 including a machine control interface.

In one example, the location device 80 of the user device U in communication with the location device 60 of the machine can prompt a machine controller L2 of a machine 16 to provide access to and/or display an MCI 84 for that machine 16 or a menu including an option to select the MCI 84 for that machine 16 when the user device U is within a predetermined distance of that machine 16, which can be defined by the enabled area 91 and/or can be defined by the location of the user device U, for example, in a facility and/or a portion of the facility including the machine 16. For example, referring to FIGS. 11 and 12, FIG. 11 shows a floor plan of a facility 14A including the location of various user devices U1 . . . U4 in the facility 14A at a given point in time. FIG. 12 shows an MCI 84 displaying a machine layout display 116 showing for example, the floor plan of a facility 14A including machines 16A . . . 16F. In one example, the MCI 84 shown in FIG. 12 may be displayed to any user device U located in the facility 14A, and a user can access an MCI 84 for each of the machines 16A . . . 16G in the facility 14A by touching and/or pressing a corresponding one of the UIEs 86G . . . 86N of the MCI 84 shown in FIG. 12. The MCI 84 for the selected machine 16A . . . 16G may be displayed, for example, as an SOP display 33 (see FIG. 5) or a heartbeat display 35, or a menu may be displayed to the user on the user device U to enable the user to select from multiple MCI 84 display formats available for the selected machine 16.

In another example, where the user and/or the user device U is authenticated or otherwise enabled for controlling one or more of the machines 16 via an MCI 84 displayed on the user device, the MCI 84 shown in FIG. 12 may indicate on the display those machines which are enabled for control via the user device U. For example, referring to FIGS. 11 and 12, when a user device U2 is located in a control enabled area 91 of a machine 16 for which control of that user machine 16 by user device U2 has been authorized, the machine icon on the display shown in FIG. 12 may be differentiated on the display to indicate to the user that the user device U2 is in a control enabled area 91 for that machine 16, and the user can, from that location, control operations of that machine. In an illustrative example, the user device U2 is shown in FIG. 11 as being located within two overlapping enabled areas 91C and 91D defined respectively for machines 16C and 16D. While the user device U2 is located at this location, the icons representing the enabled areas 91C, 91D are differentiated to indicate to the user of the user device U2 that control of the machines 16C and 16D is enabled from that location. In the illustrative example, the icons for machines 16C and 16D are differentiated on the display in FIG. 12 by a double ring, however it would be understood that any form of graphical differentiation could be used. For example, the control enabled areas 91C, 91D could be differentiated in the display by color, highlighting, etc.

Referring again to FIGS. 5 and 6, each MCI 84 of the SOP display 33 and the heartbeat display 35 can be enabled with multiple UIEs 86 to allow a user to the activate and/or manipulate the UIEs 86, and such that the touch screen 74 provides both an output interface and an input interface between the user and the user device U. Each of the UIE 86 can respond to haptic and/or tactile (touch) contact from the user, which may be applied in a predetermined pattern to provide an input to the touch screen 74. For example, an UIE 86 can be activated by a touch pressure (point pressure or press and hold) applied by, for example, a finger of a user on the area of the touch screen 74 where the UIE 85 is located, by a touch motion of a user such as a sliding motion of the user's finger across the area of the touch screen 74 defining the UIE 86, and/or a combination of a touch pressure and a touch motion. In an illustrative example shown in FIG. 5, the user can apply a touch pressure on a UIE 86, such as UIE 86D corresponding to operation Op8 in SOP 39, to activate the UIE 86D to display additional information about operation Op8. In one example, applying a touch pressure on the UIE 86D can activate the user device U and/or the MCI 84 to display detailed information about the operation Op8, including listing the names and details of each of the elements E1, E2 performing the operation Op8, which can be displayed, by way of non-limiting example, in a pop-up window (not shown) imposed on the MCI 84 and/or in a new screen display. In another example, applying either of a touch pressure or a touch motion such as a sliding motion to the UIE 86E corresponding to the baseline cycle indicator 29 and/or the actual cycle indicator 31 of the operation Op8 can activate the user device U and/or the MCI 84 to display additional information about the operation Op8, which may include, for example, the baseline (design intent) start time, cycle time and stop time for the operation Op8, the actual start time, cycle time and stop time of operation Op8 in the operational cycle displayed in FIG. 5, and any preconditions which may be required before operation Op8 is started. For example, completion of operation Op5 may be a precondition to starting operation Op8 and such information may be displayed in response to the user activating the UIE 86E with a touch action. The additional information can, by way of example, be displayed in a pop-up screen, in another screen, etc. FIG. 5 shows the actual cycle indicator 31 for operation Op8 is colored "RED", and the remaining actual cycle indicators 31 for the other operations Op1 . . . Op7 and Op9 are colored "GREEN", indicating, in the illustrative example, that a fault alert or alarm has been set for operation Op8. By touching the UIE 86E in a predetermined manner, the user can activate the user device U and/or the MCI 84 to display additional information about the fault alert or alarm, such as the condition state generating the fault alert and/or one or more condition states of the machine 16 and/or the elements E1 . . . E7 which can be related to the fault alert. In a non-limiting example, the condition state generating the fault alert could be one of the elements E1, E2 in one of a blocked, starved, stopped, etc. condition and/or could include input from one or more sensors S which are in communication with at least one of the elements E1, E2 to determine a condition state of the elements E1, E2, where the input from the sensors S is displayed to the user in response to the user touching the UIE 86D in the predetermined manner. The additional fault alert information can be displayed in a pop-up screen or another screen, and/or the user device U can direct the user to another area of the AOS 10, for example, to an issue tracking system included in the AOS 10, to view additional information such as causal information, corrective action status, and/or a countermeasure plan to assist in resolving the faulted condition. The examples provided herein are illustrative and non-limiting, and it would be understood that various UIEs 86 can be defined by the MCI 84 which can be activated by a touch action to display and/or provide additional information related to the machine 16 and/or SOP 39 being displayed on the touch screen 74. For example, a UIE 86 could be defined by the legend and actuable by a touch action to display the criteria for designating an operation Op as "RED" or "GREEN." It would be understood that UIEs 86 defined in the MCI 84 shown in FIG. 6 could be similarly activated by a touch action to provide a user with access to additional information related to the operation Op and/or the cycle indicators 29, 31 associated with the UIE 86.

FIGS. 7 and 8 show an illustrative example of controlling and/or manipulating functions of a machine 16 via the MCI 84 of the user device U. In the example shown, each of the operation steps Op1 through Op9 of the SOP 39 is enabled as a UIE 86, and each of the base cycle indicators 29 and/or actual cycle indicators 31 is enabled as a UIE 86. As described herein, one or more preconditions can be required to enable the use of the MCI 84 and/or the user device U to control the machine 16, which can include user authentication, locating the user device U including the MCI 84 in an enabled area 91 defined by the machine 16 associated with the MCI 84, connecting an enabling switch 50 to the user device U, activating the enabling switch 50 and/or restricting operation of the machine 16 to manual mode, e.g., disabling automated operating mode while the MCI 84 and user device U are enabled to control the machine 16. In an illustrative non-limiting example shown in FIG. 7, where the MCI 84 and user device U has been enabled to control the machine 16, a user can control operation of the machine 16 associated with the MCI 84. In the example shown, a SOP 39 is performed by the machine 16 including operations Op1 . . . Op9. Non-limiting examples of control which can be executed using the enabled user device U and MCI 84 are illustrated by the corresponding touch actions required to execute the control. For example, a touch action 136A applied to UIE 86A can be configured as a touch pressure such as a press and hold action, where a user pressing and holding pressure on UIE 86A will trigger, e.g., actuate, performance of operation Op1 by machine 16, and specifically be elements E1, E2. Operation Op1, once initiated by the application of the touch pressure, will continue to its conclusion so long as the user continues to hold pressure on the UIE 86A. If the touch action 136A is interrupted prior to the conclusion of operation Op1, for example, by the user removing the user's hand from touch screen 74, then operation Op1 ceases without concluding. The location of UIE 86A corresponds to the display of "Op1 (E1,E2)" in the SOP 39 displayed by the MCI 84 on touch screen 74, such that the location of UIE 86A and the command to actuate operation Op1 is intuitive to the user.

In another example, touch actions 136B and 136C, applied respectively to UIE 86B and UIE 86C, can be combination touch actions requiring a press and slide motion, where a user applying pressure and sliding, for example, a fingertip in a generally horizontal direction (as shown on the page) along the timeline corresponding to the respective timelines of operations Op1 and Op5, in the example shown, actuates the respective operation Op1, Op5 corresponding to the activated UIE 86B, 86C. The direction and duration of the touch action 136B, 136C corresponds to the actuation of the operation. For example, operation Op1, once initiated by applying the touch action 136B as a sliding pressure to UIE 86B in the direction of the arrow representing touch action 136B, will continue from the start of operation Op1 to the conclusion of operation Op1 so long as the user continues to apply a sliding pressure on UIE 86B. If the touch action 136B is interrupted prior to the conclusion of operation Op1, for example, by removing the user's hand from touch screen 74, then operation Op1 ceases without concluding at the interrupted point in the operational cycle of operation Op1. Continuation of operation Op1 from the interrupted point to the conclusion of operation Op1 can be reinitiated by reinitiating and applying the sliding action 136B in the direction of the arrow indicating sliding action 136B. The location of UIE 86B corresponds to the display of the base cycle indicator 29 and/or the actual cycle indicator 31 displayed by the MCI 84 on touch screen 74, such that the location of UIE 86B and the command to actuate operation Op1 is intuitive to the user. Similarly, use of a sliding pressure in a horizontal direction along the timeline and/or cycle indicator 31 of the SOP display 33 as a form of touch action required to activate a corresponding UIE 86, such as UIE 86C for operation Op5, is intuitive to the user.

Application of a touch action 136B in a direction opposing the direction shown by the arrow representing touch action 136B actuates the machine 16 to return the event or motion to its starting position, e.g., actuates elements E1, E2 in the present example to return to a start position for operation Op1 and/or to a start condition defined by operation Op1. If the touch action 136B in the opposing direction is interrupted prior to the return of elements E1, E2 to the start position, for example, by the user removing the user's hand from touch screen 74, then operation Op1 ceases at the point of interruption of the touch action 136B without returning the elements E1, E2 to the start position and/or start condition of the operational cycle of operation Op1. It would be understood that a user could apply the touch action 136B in a generally horizontal motion and/or in different directions along the timeline of operation Op1, with intermittent interruptions in the touch action 136B, to evaluate the performance of operation Op1 and/or for observation of the operation Op1 at various points in the operation cycle of operation Op1 at and between the start and stop (finish) positions and/or conditions.

Similarly, as shown for operation Op5 in the present example, applying a touch action 136C as a sliding pressure to UIE 86C and in the direction of the arrow representing touch action 136C, actuates the machine 16 to return the event or motion to its starting position, e.g., actuates element E7 in the present example to return to a start position for operation Op5 and/or to a start condition defined by operation Op5. Element E7 will continue to return to the start position and/or start condition of operation Op5 so long as the user continues to apply a sliding pressure on UIE 86C in the direction of the arrow indicating touch action 136C. If the touch action 136C is interrupted prior to the conclusion of operation Op5, for example, by removing the user's hand from touch screen 74, then operation Op5 ceases without concluding. The location of UIE 86C corresponds to the display of the base cycle indicator 29 and/or the actual cycle indicator 31 displayed by the MCI 84 on touch screen 74 for operation Op5, such that the location of UIE 86C and the command to actuate operation Op5 is intuitive to the user. Application of a touch action 136C in a direction opposing the direction shown by the arrow representing touch action 136C, as discussed related to touch action 136B, actuates element E7 to continue from the start of operation Op1 to the conclusion of operation Op1 so long as the user continues to apply a sliding pressure on UIE 86B. It would be understood that a user could apply the touch action 136C in a generally horizontal motion and/or in different directions along the timeline of operation Op5, with intermittent interruptions in the touch action 136C, to evaluate the performance of operation Op5 and/or for observation of the operation Op5 at various points in the operation cycle of operation Op5 at and between the start and stop (finish) positions and/or conditions.

Referring now to FIG. 8, another example of a MCI 84 is shown, where the MCI 84 provides a heartbeat display 35 of the SOP 39 shown in FIG. 7. In the example shown, UIE 86F can be actuated as by a touch action 136A, as described for FIG. 7, to actuate operation Op1 by applying a touch action which in the example shown is a press and hold action. Operation Op1 will continue to conclusion so long as the user maintains the touch action 136A on the UIE 86F. Likewise, a user can apply touch actions 136D and 136E in a manner similar to that described for touch actions 136B and 136C of FIG. 7. In the example shown in FIG. 8, the touch actions 136D and 136E, applied respectively to UIE 86G and UIE 86H, can be combination touch actions requiring a press and slide motion, where a user applying pressure and sliding, for example, a fingertip in a generally vertical direction (as shown on the page) along the actual cycle indicator bar 31 (see FIG. 4) of the heartbeat display 35 displayed by the MCI 84 which corresponds the respective operations Op4 and Op5, in the example shown, actuate the respective operations Op4, Op5 corresponding to the activates UIEs 86G, 86H. The direction and duration of the respective touch action 136D, 136E corresponds to the actuation of the respective operation Op4, Op5 in a vertical direction corresponds with the performance direction of the touch action 136D, 136E, and where, as described for FIG. 7, an interruption in the respective touch action 136D, 136E interrupts performance of the respective operation Op4, Op5. For example, application of the sliding pressure touch action 136D to the cycle indicator bar 31 for operation Op4 in a direction shown by the arrow indicating the touch action 136D, e.g., in a vertical direction upward (as shown on the page) actuates element E6 to progress toward conclusion of operation Op4. Likewise, application of the sliding pressure touch action 136E to the cycle indicator bar 31 for operation Op5 in a direction shown by the arrow indicating the touch action 136E, e.g., in a vertical direction downward (as shown on the page) actuates element E7 to progress toward the start of operation Op4. It would be understood that a user could apply the touch actions 136D and 136E in a generally vertical motion and/or in different directions along the vertical bars (actual cycle indicators 31) of the heartbeat display 35, with intermittent interruptions in the touch action 136D, 136E, to evaluate the performance of the corresponding operations Op4, Op5 and/or elements E6, E7, and/or for observation of the operations Op4, Op5 and/or elements E6, E7 at various points in the operation cycle of operations Op4, Op5 at and between the start and stop (finish) positions and/or conditions. The location of UIEs 86G and 86H corresponds to the display of the actual cycle indicator 31 in the heartbeat display 35 displayed by MCI 84 on touch screen 74, such that the location of UIEs 86G and 86H and the commands to actuate operations Op4 and Op5 are intuitive to the user. Similarly, use of a sliding pressure in a vertical direction along the cycle indicator bar 31 of the heartbeat display 35 as a form of touch action required to activate a corresponding UIE 86, such as UIE 86G for operation Op4, is intuitive to the user.

Still referring to FIGS. 7 and 8, with the user device U enabled such that the MCI 84 can be used to control operations of a machine such as operations Op1 . . . Op9 shown in SOP 39 displayed by MCI 84, it would be understood that additional touch actions 136 (not shown) could be used as described for FIGS. 5 and 6. The form of the touch action used for specific function, for example, the form of a touch action used to activate a UIE 86 to display additional information related to an operation, may be different when the user device U is enabled. For example, as previously described for FIG. 7, applying a touch pressure 136A to activate UIE 86A when the user device U is enabled as a HMI control device (such that MCI 84 can be used by a user to control operation Op1) actuates elements E1,E2 to perform the operation Op1. Applying the same touch pressure 136A to activate UIE 86A when the user device U is not enabled, as previously described for FIG. 5, causes MCI 84 to display additional information related to operation Op1. Accordingly, a different form of touch action can be used when the user device U is enabled to activate UIE 86A to display additional information related to operation Op1. For example, a double tap touch action could be used to activate UIE 86A to display additional information related to operation Op1 when the user device U is enabled as an HMI control device. Other touch actions can be used to manipulate information displayed by the user device U. In one example, a user can transition between MCI 84 shown in FIG. 7 and MCI 84 shown in FIG. 8, by applying a swipe action across the touch screen 74, such that the user can alternate between the SOP display 33 and the heartbeat display 35 of the SOP 39 when monitoring and/or controlling the machine 16 performing the operations of SOP 39.

It would be understood that various combinations of touch actions 136, UIE 86 arrangements, and MCI 84 display configurations can be used to view, monitor and/or manipulate information displayed by an MCI 84 on the user device U, including information accessible via AOS 10, and that various combinations of touch actions 136, UIE 86 arrangements, and MCI 84 display configurations can be used to control operations Op performed by a machine 16 via an MCI 84 using the user device U in an enabled state, e.g., enabled as an HMI control device to control operations of the machine 16, and as such the examples provided herein are provided for illustrative purpose and are non-limiting.

In one example, the response of the MCI 84 and/or the user device U to a touch action provided by a user to a UIE 86 can be determined by the MCI 84 and/or the user device U using additional criteria which can include, for example, the authentication level of the user of the user device U. In one example, the user of the user device U can be authenticated, for example, via a login system, as having "viewer only" access, such that the MCI 84 would be non-responsive to touch actions reserved for controlling the machine associated with the MCI 84, and would only be response to touch actions, for example, requesting viewing of additional information. In this way, the MCI 84 may appear the same to a viewer only user and to a user with control authorization, however the UIEs 86 would be limited in response to the authority level of the user. In another example, the response of the MCI 84 and/or the user device U to a touch action provided by a user to a UIE 86 can be determined by the MCI 84 and/or the user device U using additional criteria which can include, for example, the location of the user device U, and/or the location of the user device in combination with the authenticated authority level of the user. For example, the control function response to a touch action provided by a user to a UIE 84 may be deactivated unless it is determined, for example, using the location device 80 of the user device U, that the user device U is located in an enabled area 91 of the machine 16 associated with the MCI 84, as described related to FIGS. 10, 11 and 12.

In another example, the response of the MCI 84 and/or the user device U to a touch action provided by a user to a UIE 86 can be determined by the MCI 84 and/or the user device U using additional criteria which can include, for example, detecting an enabling switch 50 connected to the user device U, where the enabling switch 50 can be configured to interact with the user device U and/or the MCI 84 such that both hands of the user are occupied with activating the enabling switch 50 and interfacing with the user device U when controlling the machine 16 using the MCI 84. In one example, the enabling switch 50 must be manually activated, e.g., the trigger 66 must be depressed by the user's hand, to use the UIEs 86 of the MCI 84 to control actions of the machine 16 associated with the MCI 84. The criteria of a connected and/or activated enabling switch 50 may be combined with at least one other criteria to enable the machine control functions of the UIEs 86. For example, the control function response to a touch action provided by a user to a UIE 84 may be deactivated unless it is determined, for example, that the user device U is located in an enabled area 91 of the machine 16 associated with the MCI 84, and the user of the user device U has authenticated authority to control the machine 16.

Referring now to FIGS. 9 and 12, shown is a user device U connected to an enabling switch 50 such that the user device U can be enabled for use as an automation human machine interface (HMI) device 175 for controlling a machine 16, including controlling one or more of an element E, station ST of the machine 16 and/or operation Op of a SOP 39 performed by the machine 16. As a precondition for controlling the machine 16 via the user device U and/or enabling the user device U as an HMI control device 175, operation of the machine 16 in manual mode only can be required, such that control of the machine 16 via the enabled user device U, e.g., via the HMI control device 175, is limited to control in a manual mode only. The enabling switch 50 may also be known as a "dead man switch," a "live man switch," or an "operator presence control (OPC)" as those terms are commonly understood related to automation control. The enabling switch 50, as shown in FIG. 9, includes a switch connector 52 and switch cable 64 for connecting the enabling switch 50 to the user device U, for example, by connection of the switch connector 52 to a connector port 72 of the user device U. In one example, the switch connector 52 and the connector port 72 can each be a Universal Serial Bus (USB) type connector, such that the enabling switch 50 and the user device U can be in communication with each other. The length and/or configuration of the switch cable 64 can be of a type which requires a user to occupy both hands in the use of the HMI control device 175 when the enabling switch 50 is connected to the user device U. For example, the switch cable 64 should be limited in length and/or non-extendable to prevent and/or avoid concurrent use of the enabling switch 50 by one person and input to an MCI 84 displayed on the user device U by another person when the enabling switch 50 is connected to the user device U. The illustrated example is non-limiting, and other means of limiting the concurrent triggering of the enabling switch 50 and input to the touch screen 74 of the user device U by two different users could be used. For example, the enabling switch 50 may be mounted to the user device U by a bracket (not shown) configured to keep both hands of a user occupied in the use of the HMI control device 175 while retaining the enabling switch 50 in close proximity to the user device U to prevent and/or avoid concurrent use of the enabling switch 50 by one person and touch input to the touch screen 74 by another person. In this example, the bracket may be selectively attachable to one or both of the enabling switch 50 and the user device U such that the enabling switch 50 can be disconnected from the user device U when not required to enable the user device U as a HMI control device 175. The enabling switch 50 can include a power source, which can be a replaceable and/or rechargeable power source such as a battery or power cell, and/or can be powered by the power source of the user device U via the connection established by the connector 52 and connector port 72.

The enabling switch 50 includes at least one trigger 66 for manually triggering, e.g., switching or activating, the enabling switch 50 to an enabled state. The trigger 66 can be a two-way switch designed to close when a grasping pressure is exerted on the trigger 66, for example, by a hand of a user, and to open when the grasping pressure is relieved, e.g., when the hand of the user relaxes and/or is removed from the trigger 66. The trigger 66 can be a three-way switch designed to close when a grasping pressure is exerted on the trigger 66 to place the trigger 66 in a mid-position, and to open when the grasping pressure of a user is relieved from the trigger 66, and to open when the grasping pressure of a user is increased to fully compress, in the example shown, the trigger 66, such that the enabling switch 50 in a three-way configuration requires the user to maintain a specific triggering pressure on the trigger 66 to activate the enabling switch 50. The enabling switch 50 can include a finger pad 68, which may be referred to as a grip pad or finger rest, for use in grasping the enabling switch 50 and/or balancing the triggering pressure exerted by the user's hand on the trigger 66. The enabling switch 50 can include a switch indicator 62 to provide an output to the user indicating the condition status of the enabling switch 50. For example, the switch indicator 62 can be configured to change color to indicate connection to a user device U, location of the enabling switch U in an enabled area 91, switch condition of the trigger 66 (open or closed), etc. In one example, the enabling switch 50 can include a locking mechanism including a removable key 58 which must be installed to the enabling switch 50 to unlock the enabling switch 50 to an operable state. The locking mechanism and/or key 58 can be of any suitable type, by way of example, including one of a mechanical, magnetic, or electromagnetic key 58. In one example, access to the key 58 may be limited to authorized users, e.g., users who are qualified to control a machine 16 using the HMI control device 175 including the enabling switch 50.

The enabling switch 50 includes a processor 70 and a memory 54, some of which is computer-readable tangible, non-transitory memory arranged on a printed circuit board or otherwise available to the processor 70. Instructions embodying the methods described herein may be programmed into memory 54 and executed as needed via the processor 70 to provide functionality of the enabling switch 50 as described herein. The memory 54 may include, by way of example, sufficient read only memory (ROM), optical memory, flash or other solid state memory, and the like. Transitory memory such as random access memory (RAM) and electrically-erasable programmable read-only memory (EEPROM) may also be included, along with other required circuitry (not shown), including but not limited to a high-speed clock, current/voltage/position sensing circuitry, analog-to-digital (A/D) circuitry, digital-to-analog (D/A) circuitry, a digital signal processor, and any necessary input/ output (I/O) devices and other signal conditioning and/or buffer circuitry. The enabling switch 50 can include a location device 56 a location device, such as a GPS transmitter/receiver or an RFID which can be used to authenticate location of the enabling switch 50 and/or to communicate with another location device such as a machine location device 60 of a machine 16, a location device 80 of a user device U, etc., to establish the location of the enabling switch 50 relative to the other location device and/or within an area, such as the location of the enabling switch 50 within a facility 14 and/or within an enabled area 91 of a machine 16.

In an illustrative example, at least three prerequisite conditions must be satisfied for a user device U to be enabled as an HMI control device 175 using the enabling switch 50. In this example, the first condition is connection of the enabling switch 50 to the user device U, for example, by connection of the connector 52 to the connector port 72. The second condition is providing an MCI 84 for the machine 16 to be controlled by the HMI control device 175, e.g., by the enabled user device U, to the user device U for display on the touch screen 74 of the user device U and enablement of the UIEs 86 required to control the machine 16 using touch input to the displayed MCI 84. A third condition is activating the enabling switch 50 to an enabled state by activating the trigger 66 to close the switch of the enabling switch, as previously described, where the MCI 84 and/or the UIEs 86 defined by the MCI 84 are only enabled for control of the machine 16 when the trigger 66 is activated by the user to the enabled state.

In one example, an MCI 84 for controlling a specific machine 16 can be stored in the memory 54 of the enabling switch 50, such that the enabling switch 50 is customized, e.g., configured, for use with only that specific machine 16, and the MCI 84 is retrievable by the user device U from the MCI 84, for display by the user device U and control of the specific machine 16, via the connection between the enabling switch 50 and the user device U, e.g., via the connection established by connector 52 and connector port 72. The enabling switch 50 can be programmed with, e.g., can receive and store the MCI 84 to memory 54, from AOS 10, for example, from a facility server L3 and/or via connection to the network 80. In another example, multiple MCIs 84 corresponding to multiple machines 16 can be stored in the memory 54 of the enabling switch 50, such that the MCIs 84 corresponding to the machine 16 to be controlled by the HMI control device 175 can be selected from the multiple MCIs stored on the enabling switch 50 and retrieved by the user device U connected to the enabling switch 50, for display on the touch screen 74 of the user device U. In another example, the MCI 84 can be retrieved from AOS 10 by the user device U, for example, from a facility server L3 or data memory storage 90, for example, via the network 80. In one example, connection of the enabling switch 50 to the user device U can be required for the user device U to retrieve an MCI 84 from AOS 10 via the network 80. In one example, the enabling switch 50 can provide an authentication code or password to the user device U for retrieving an MCI 84 from AOS 10 which may only be usable by the user device U while the enabling switch 50 is connected to the user device U, as a means of authenticating the user device U to the AOS 10. In one example, the user of the user device U can be required to provide a user password or user authentication code to the AOS 10 to access and retrieve the MCI 84 for download to the user device U, where the user password or authentication code can be used by the AOS 10 to authenticate the user as an authorized user, e.g., a user who is qualified to control the machine 16 corresponding to the MCI 84 being retrieved to the user device U.

In an illustrative example, one or more supplemental conditions may be required in addition to the three prerequisite conditions, to enable the HMI control device 175 to control a machine 16 via a MCI 84 displayed by the user device U. In one example of a supplemental condition, the HMI control device 175 must be located within an enabled area 91 of the machine 16 to be controlled. Location of the HMI control device 175 in the enabled area 91 can be established, for example, by communication of the location device 56 of the enabling switch 50 with the location device 60 of the machine 16 to be controlled, for example, where each of the location devices 56, 60 can be RFID type devices. In another example, each of the location devices 56, 60 can be GPS type devices, where the location of the HMI control device 175 relative to the location of the machine 16 can be established by GPS signals received from both location devices 56, 60 via the network 80, to a server or controller configured for that purpose, such as a facility server L3. In this example, and referring to FIGS. 11 and 12, the HMI control device 175C would satisfy the supplemental condition for control of machines 16C and 16D by establishing the location in the enabled areas 91C and 91D defined for the respective machines 16C and 16D using the location devices 60C, 60D and the location device 56 of the enabling switch 50C. As shown in FIG. 12, a machine layout display 116 displayed to a user on the user device U2 can be differentiated (for example, by the double rings differentiating areas 91C and 91D in FIG. 12) to indicate to the user that machines 16C and 16D can be controlled by the user device U2 based on the present location of the user device U2 in the overlapping area of the enabled areas 91C and 91D.

In another example of a supplemental condition, the machine 16 to be controlled must be placed in manual operating mode to enable control via HMI control device 175. The placement of the machine 16 into manual operating mode can be communicated by the machine controller L2 of the machine 16 being controlled, via the machine controller L2 in communication with the facility server L3 and/or the network 80, such that the status of the machine 16 in manual operating mode can be confirmed to and monitored by the MCI 84 via the user device U in communication with machine controller L2 and/or the facility server L3 via the network 80. The examples provided are non-limiting and illustrative, and other supplemental conditions could be required. It would be understood that if any one of the prerequisite conditions or any one of the supplement conditions, where supplemental conditions are applied, are not met, the control functions of the MCI 84 would be disabled however the user device U including the MCI 84 could be used to view and monitor data collected from and/or related to the operation of the machine 16 corresponding to the MCI 84, as previously described.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling automation, the method comprising:
    collecting, via a machine configured to perform a sequence of operations (SOP), data generated by performance of at least one operation by the machine;
    transmitting, via the machine, the data to a network in communication with the machine;
    wherein the at least one operation is one operation of the sequence of operations (SOP) performed by the machine;
    wherein the machine can be selectively operated in an automated mode to perform the at least one operation;
    wherein the data includes at least one of a baseline cycle time for the at least one operation and an actual cycle time for performance of the at least one operation;
    receiving, via a user device in communication with the network, a machine control interface (MCI) corresponding to the machine;
    wherein the user device includes a touch interface;
    displaying the MCI on the touch interface;
    wherein the MCI displays:
        the sequence of operations including the at least one operation;
        the data generated by performance of the at least one operation by the machine;
        a first touch activated user interface element (UIE) defined by the data displayed by the MCI; and
        at least one of:
            a baseline cycle indicator displaying the baseline cycle time of the at least one operation; and
            an actual cycle indicator displaying the actual cycle time of the at least one operation;
    wherein the user device is enabled as an automation human machine interface (HMI) device for controlling the at least one operation such that a first touch action applied to the first UIE controls performance of the at least one operation by the machine;
    connecting an enabling switch to the user device;
    wherein activation of the enabling switch is a prerequisite condition to enabling the user device as the automation HMI device; and
    wherein:
        the first UIE comprises a path defined by the at least one of the baseline cycle indicator and the actual cycle indicator;
        the first touch action applied to the first UIE as a sliding pressure in a first direction along the path actuates performance of an operation cycle of the at least one operation to a conclusion of the operation cycle;
        the first touch action applied to the first UIE as a sliding pressure in a second direction along the path and opposing the first direction actuates performance of the operation cycle of the at least one operation to return to a start condition of the operation cycle; and
        a selective interruption of the first touch action along the path interrupts performance of the operation cycle of the at least one operation at a selected point in the operation cycle; and
    wherein the selected point in the operation cycle is between the start condition and the conclusion of the operation cycle.

2. The method of claim 1, further comprising:
    displaying, via the MCI, the at least one of the baseline cycle indicator and the actual cycle indicator in an SOP timeline display.

3. The method of claim 1, further comprising:
    displaying, via the MCI, the at least one of the baseline cycle indicator and the actual cycle indicator in a heartbeat display.

4. The method of claim 1, further comprising:
    displaying, via the MCI, a second touch activated user interface element (UIE) defined by the at least one operation displayed by the MCI;
    wherein a second touch action applied to the second UIE controls performance of the at least one operation by the machine.

5. The method of claim 1, wherein connection of the enabling switch to the user device is a prerequisite condition to the user device receiving the MCI via the network.

6. The method of claim 1, further comprising:
    controlling, via an automation controller in communication with the network, performance of the machine in the automated mode.

7. A method for controlling automation, the method comprising:
    providing a machine including at least one element;
    wherein the at least one element is controllable to perform at least one operation;
    wherein the machine is in communication with a network;
    providing a user device including a connector port;
    wherein the user device is in communication with the network;
    providing an enabling switch comprising:
        a trigger configured to switch the enabling switch to an enabled state only when the trigger is manually activated by a user;
        wherein the trigger is manually activated only when a continuous manual input is applied to the trigger by the user; and
        a connector for selectively connecting the enabling switch to the connector port of the user device;
    retrieving, via the user device via the network, a machine control interface (MCI) defining at least one touch activated user interface element (UIE);
    displaying the MCI on a touch screen of the user device;

wherein connection of the enabling switch to the user device via the connector is a prerequisite condition to the user device retrieving the MCI via the network; and wherein the at least one UIE can be activated by a touch input to the touch screen to control performance of the at least one operation;

wherein the user device is selectively enabled as an automation human machine interface (HMI) device for controlling the at least one operation only when:

the enabling switch is connected to the user device via the connector;

the MCI is displayed on the touch screen; and the trigger is manually activated by the user such that the enabling switch is in the enabled state.

8. The method of claim 7, further comprising:

defining an enabled area;

wherein the enabled area is defined by a machine location of the machine;

wherein the enabling switch includes a first location device for determining a location of the enabling switch relative to the enabled area;

determining, via the first location device, the location of the enabling switch relative to the enabled area;

enabling the automation HMI device to control the machine, when the automation HMI device is located within the enabled area; and disabling the automation HMI device from controlling the machine when the automation HMI device is located outside the enabled area.

9. The method of claim 8, further comprising:

providing a second location device for determining the enabled area; and selectively communicating, via the first location device with the second location device to determine the location of the automation HMI device relative to the enabled area.

10. The method of claim 7, wherein:

the machine can be selectively operated in an operating mode which is one of an automated mode and a manual mode;

communicating, via the automation HMI device, with the machine to determine the operating mode of the machine;

enabling the automation HMI device to control the machine when the machine is operated in the manual mode; and disabling the automation HMI device from controlling the machine when the machine is operated in the automated mode.

11. The method of claim 7, wherein:

the at least one operation is one of a sequence of operations (SOP) performed by the machine;

collecting, via the machine, data including at least one of a baseline cycle time for the at least one operation and an actual cycle time for performance of the at least one operation;

displaying, via the MCI:

the sequence of operations including the at least one operation; and at least one of:

a baseline cycle indicator displaying the baseline cycle time of the at least one operation; and an actual cycle indicator displaying the actual cycle time of the at least one operation.

12. The method of claim 11, wherein:

the at least one UIE comprises a path defined by the at least one of the baseline cycle indicator and the actual cycle indicator; and the touch input applied to the at least one UIE as a sliding pressure in a first direction along the path actuates performance of an operation cycle of the at least one operation to a conclusion of the operation cycle; and the touch input applied to the at least one UIE as a sliding pressure in a second direction along the path and opposing the first direction actuates performance of the operation cycle of the at least one operation to return to a start condition of the operation cycle; and a selective interruption of the touch input along the path interrupts performance of the operation cycle of the at least one operation at a selected point in the operation cycle; and wherein the selected point in the operation cycle is between the start condition and the conclusion of the operation cycle.

13. The method of claim 7, further comprising:

defining an enabled area;

wherein the enabled area defined by a machine location of the machine; and locating the user device in the enabled area as a prerequisite condition to enabling the user device as the automation HMI device.

14. The method of claim 7, further comprising:

providing at least one of a password and an authentication code via at least one of the user device and the enabling switch to the network as a prerequisite condition to the user device retrieving the MCI via the network.

* * * * *